United States Patent
Toyoda et al.

(10) Patent No.: US 10,269,128 B2
(45) Date of Patent: Apr. 23, 2019

(54) IMAGE PROCESSING DEVICE AND METHOD, AND RECORDING MEDIUM

(71) Applicant: MITSUBISHI ELECTRIC CORPORATION, Tokyo (JP)

(72) Inventors: Yoshitaka Toyoda, Tokyo (JP); Toshiki Fujino, Tokyo (JP); Kohei Kurihara, Tokyo (JP); Narihiro Matoba, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 15/559,722

(22) PCT Filed: Feb. 16, 2016

(86) PCT No.: PCT/JP2016/054356
§ 371 (c)(1),
(2) Date: Sep. 19, 2017

(87) PCT Pub. No.: WO2016/167014
PCT Pub. Date: Oct. 20, 2016

(65) Prior Publication Data
US 2018/0047176 A1    Feb. 15, 2018

(30) Foreign Application Priority Data

Apr. 16, 2015  (JP) .................................. 2015-083872

(51) Int. Cl.
*G06T 3/00* (2006.01)
*G06T 7/33* (2017.01)
*G06T 5/50* (2006.01)
*H04N 5/232* (2006.01)
*G06T 3/40* (2006.01)
*G06T 5/00* (2006.01)
*G06T 7/30* (2017.01)

(52) U.S. Cl.
CPC ............ *G06T 7/337* (2017.01); *G06T 3/0068* (2013.01); *G06T 3/4007* (2013.01);
(Continued)

(58) Field of Classification Search
CPC ......... G06T 7/337; G06T 7/30; G06T 7/0068; G06T 7/4007; G06T 5/002; G06T 5/008;
(Continued)

(56) References Cited

U.S. PATENT DOCUMENTS 6,205,259 B1 * 3/2001 Komiya .................... G06T 5/50
382/284
9,310,737 B2 * 4/2016 Kojima .................. G03G 15/36
(Continued)

FOREIGN PATENT DOCUMENTS

JP   2008-205935 A    9/2008
JP   2008-293185 A   12/2008
(Continued)

*Primary Examiner* — Ali Bayat
(74) *Attorney, Agent, or Firm* — Birch, Stewart, Kolasch & Birch, LLP

(57) ABSTRACT

An image processing device includes: one or more detectors that respectively receive reference images, and each detect, for each pixel in the reference image, a displacement relative to a base image; one or more generators that respectively receive the reference images, and each generate an aligned image by, for each pixel in the reference image, moving the pixel according to the displacement for the pixel and assigning a grayscale value of the pixel to a pixel position closest to the moved pixel; and a combiner that takes each pixel in the base image as a pixel of interest and calculates a grayscale value of a pixel at the same position as the pixel of interest in a combined image by weighting and summing grayscale values of the pixel of interest and pixels at the same position as the pixel of interest in the aligned images.

13 Claims, 14 Drawing Sheets

(52) U.S. Cl.
CPC ............ *G06T 3/4053* (2013.01); *G06T 5/002* (2013.01); *G06T 5/008* (2013.01); *G06T 5/50* (2013.01); *G06T 7/30* (2017.01); *H04N 5/232* (2013.01); *G06T 2207/20182* (2013.01); *G06T 2207/20208* (2013.01); *G06T 2207/20216* (2013.01)

(58) Field of Classification Search
CPC ....... G06T 5/50; G06T 3/0068; G06T 3/4007; G06T 3/4053; G06T 2207/20182; G06T 2207/20208; G06T 2207/20216
See application file for complete search history.

(56) References Cited

U.S. PATENT DOCUMENTS

| | | | | |
|---|---|---|---|---|
| 2003/0113034 | A1* | 6/2003 | Komiya | G06T 5/50 382/284 |
| 2006/0245640 | A1* | 11/2006 | Szczuka | G06T 5/50 382/154 |
| 2008/0298639 | A1 | 12/2008 | Tsunekawa et al. | |
| 2009/0167928 | A1 | 7/2009 | Asukabe et al. | |
| 2010/0067820 | A1 | 3/2010 | Yano | |
| 2010/0183245 | A1* | 7/2010 | Oryoji | G06T 3/4053 382/299 |
| 2012/0008005 | A1 | 1/2012 | Fukunishi | |
| 2014/0226902 | A1 | 8/2014 | Yamaguchi | |
| 2016/0353068 | A1* | 12/2016 | Ishikawa | H04N 9/3147 |

FOREIGN PATENT DOCUMENTS

| | | |
|---|---|---|
| JP | 2009-005119 A | 1/2009 |
| JP | 2010-219807 A | 9/2010 |
| JP | 2011-019245 A | 1/2011 |
| JP | 2011-044846 A | 3/2011 |
| JP | 2011-250458 A | 12/2011 |
| JP | 2012-019337 A | 1/2012 |
| JP | 2012-147087 A | 8/2012 |
| JP | 2014-154108 A | 8/2014 |

* cited by examiner

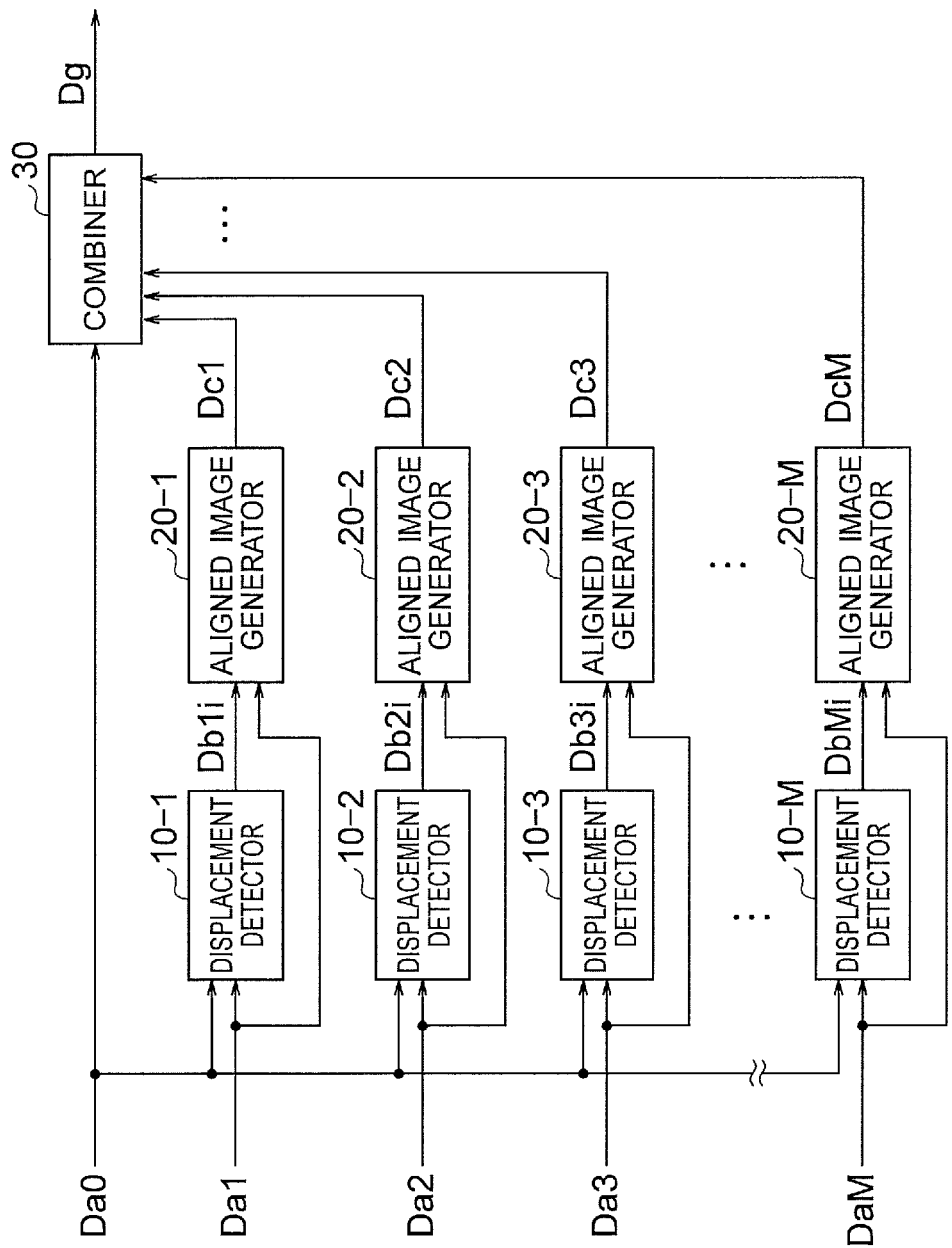

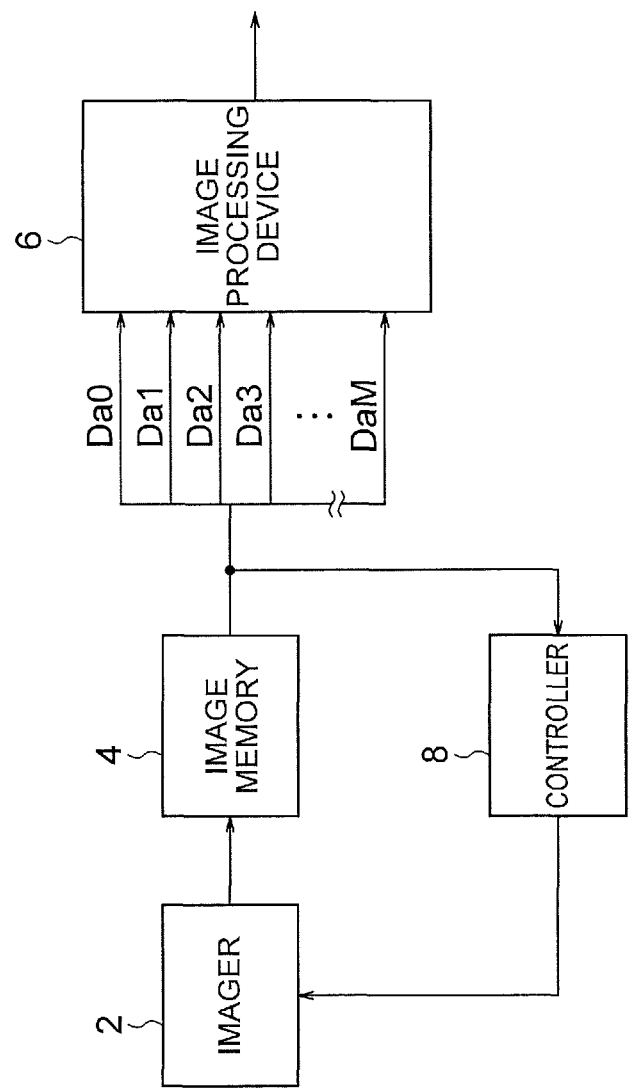

IMAGE PROCESSING DEVICE AND METHOD, AND RECORDING MEDIUM

TECHNICAL FIELD

The present invention relates to an image processing device and image processing method for combining multiple images to obtain a high quality image. The present invention also relates to a program for causing a computer to execute processing in the above image processing device or image processing method, and a recording medium storing the program.

BACKGROUND ART

There is an image processing technique that combines multiple images to obtain an image having a higher S/N and a higher dynamic range than the individual original images. This technique has a problem in that, when the imager or object is moving while the multiple images are imaged, an image obtained by overlaying images displaced from each other is generated as the combined image.

For example, Patent Literature 1 tries to solve the above problem by compensating displacements between multiple images to be combined, on the basis of motion vectors obtained between the images, and changing combination ratios of the images on the basis of reliabilities of the motion vectors.

CITATION LIST

Patent Literature

Patent Literature 1: Japanese Patent Application Publication No. 2012-19337 (paragraphs 0026 to 0030)

SUMMARY OF INVENTION

Technical Problem

When it is difficult to obtain multiple images having the same viewpoint due to constraints on imaging, e.g., when the imager is moving fast, if it is tried to improve image quality by the above method, it is required to perform a deformation process on images having different viewpoints and combine them.

The deformation process on the images can be performed by a method of determining, for each pixel in an image after deformation, the position of a portion corresponding to the pixel in an image before deformation, or a method of determining, for each pixel in an image before deformation, the position of a portion corresponding to the pixel in an image after deformation.

When for each pixel in an image after deformation, the position of a portion corresponding to the pixel in an image before deformation is determined, the value of each pixel in the image after deformation is determined by resampling it using the grayscale values of pixels peripheral to the position of the corresponding portion in the image before deformation. In this case, there is a problem in that the high frequency component is deteriorated due to the frequency characteristic of a kernel used in the resampling, and the image after deformation is blurred.

When for each pixel in an image before deformation, the position of a portion corresponding to the pixel in an image after deformation is determined, the values of pixels in the image after deformation by assigning the value of each pixel in the image before deformation to a pixel closest to the position of the corresponding portion in the image after deformation. In this case, it is possible to perform the image deformation while preventing the problem caused by resampling. However, this method causes pixels (undefined pixels) whose grayscale values are undefined, in the image after deformation, due to ununiformity in pixel sampling density caused by the deformation or other factors, and provides no improvement in image quality with the combination at portions of the undefined pixels.

The above method disclosed in Patent Literature 1 provides no solution to the above problems caused by the deformation process.

The present invention has been made to solve the above problems, and is intended to make it possible to generate a high quality combined image even when input images have different viewpoints.

Solution to Problem

An image processing device of the present invention is an image processing device for combining and outputting a plurality of input images consisting of a base image and one or more reference images, the image processing device including:

one or more displacement detectors that respectively receive the one or more reference images as inputs, and each detect, for each pixel in the received reference image, a displacement relative to the base image;

one or more aligned image generators that respectively receive the one or more reference images as inputs, and each generate, from the received reference image, an aligned image that has pixels and in which grayscale values of at least a subset of the pixels have been defined; and a combiner that combines the base image and the aligned images generated by the one or more aligned image generators to output a combined image, wherein each of the aligned image generators generates the aligned image by, for each pixel in the received reference image, moving the pixel according to the displacement for the pixel and assigning and giving a grayscale value of the pixel to a pixel position closest to a position of the moved pixel, and by giving no grayscale values to pixel positions in the aligned image to which no pixels in the reference image are assigned, and wherein the combiner takes each pixel in the base image as a pixel of interest and calculates a grayscale value of a pixel at the same position as the pixel of interest in the combined image by weighting and summing a grayscale value of the pixel of interest and grayscale values of pixels at the same position as the pixel of interest in the aligned images using weights depending on whether each pixel in each of the aligned images is a pixel whose grayscale value has been defined, or by weighting and summing the grayscale value of the pixel of interest and the grayscale values of the pixels at the same position as the pixel of interest in the aligned images after interpolating grayscale values of pixels whose grayscale values have not been defined.

Advantageous Effects of Invention

According to the present invention, it is possible to generate a high quality combined image even when input images have different viewpoints.

BRIEF DESCRIPTION OF DRAWINGS

FIG. 1 is a block diagram illustrating an image processing device of a first embodiment of the present invention.

FIG. 2 is a block diagram illustrating an example of an imaging apparatus including the image processing device of FIG. 1.

DESCRIPTION OF EMBODIMENTS

First Embodiment

Figure 3C:
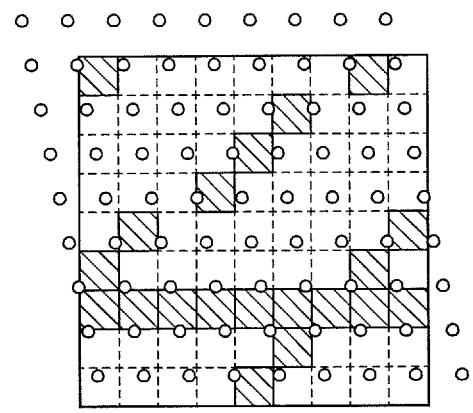
FIGS. 3a to 3c are conceptual diagrams of displacements and an aligned image.

FIG. 1 illustrates an image processing device of a first embodiment of the present invention.

The image processing device of FIG. 1 receives N (N is an integer greater than or equal to 2) input images and combines these images to generate a single combined image Dg. Here, one of the N input images is taken as a base image Da0, and the other input images are taken as reference images Da1 to DaM, where M is equal to N−1 and thus is an integer of 1 or more.

FIG. 2 illustrates an example of an imaging apparatus including the image processing device of the first embodiment of the present invention.

The imaging apparatus of FIG. 2 includes an imager 2, an image memory 4, an image processing device 6, and a controller 8. The image processing device of FIG. 1 can be used as the image processing device 6 of FIG. 2.

The imager 2 performs imaging while an exposure condition, such as an exposure time, is controlled by the controller 8. The controller 8 determines the exposure condition on the basis of the brightness of an image output from the image memory 4 or other factors and controls the imager 2. For example, the exposure time is shortened as the image becomes brighter. Instead of determining the exposure condition on the basis of the brightness of an image obtained by imaging, it is possible to determine the exposure condition on the basis of previously obtained information, such as information regarding light source conditions, information regarding the reflectance of an object, or information regarding image processing conditions, such as a signal conversion characteristic or a dynamic range, of the imaging apparatus.

Imaged images obtained by imaging by the imager 2 at different times are sequentially stored in the image memory 4; N (N is an integer greater than or equal to 2) images are simultaneously read from the image memory 4 and are supplied to the image processing device 6 as the base image Da0 and reference images Da1 to DaM.

In the example of FIG. 2, the base image Da0 and reference images Da1 to DaM are images obtained by imaging by the same single imager 2 at different times, and thus can have different viewpoints due to movement of the imager 2 or an object.

The image processing device of FIG. 1 includes M displacement detectors 10-1 to 10-M, M aligned image generators 20-1 to 20-M, and a combiner 30. In the example illustrated in the drawing, M is an integer greater than or equal to 2, but M may be 1.

The displacement detectors 10-1 to 10-M respectively receive M reference images Da1 to DaM as inputs, and each detect, for each pixel Dami in the received reference image Dam (m is an integer from 1 to M), a displacement Dbmi relative to the base image Da0.

The character "i" in the reference character "Dami" representing each pixel in the reference image Dam and the character "i" in the reference character "Dbmi" representing the displacement for each pixel are reference characters for identifying the pixels and take a value from 1 to I (I is the total number of pixels constituting the image). The same applies to pixels in the base image Da0, pixels in the combined image Dg, and pixels in aligned images Dc1 to DcM described later.

The aligned image generators 20-1 to 20-M respectively receive M reference images Da1 to DaM as inputs, and each generate the aligned image Dcm from the received reference image Dam.

Each aligned image generator 20-m of the aligned image generators 20-1 to 20-M generates the aligned image Dcm, in which grayscale values of at least a subset of the pixels are defined, by, for each pixel Dami in the received reference image Dam, moving the pixel Dami according to the displacement Dbmi for the pixel Dami and assigning a grayscale value of the pixel Dami to a pixel position closest to the position of the moved pixel.

Here, the grayscale value of each pixel is, for example, a value (brightness value) indicating the brightness of the pixel. Instead, the grayscale value of each pixel may be a value (color component value) indicating the intensities of color components, such as red, green, and blue components, of the pixel.

The combiner 30 combines the base image Da0 and the M aligned images Dc1 to DcM generated by the M aligned image generators 20-1 to 20-M.

The combiner 30 performs the above combination by weighting and summing them using weights depending on whether each pixel in each of the M aligned images Dc1 to DcM is a pixel whose grayscale value has been defined, or weighting and summing them after interpolating the grayscale values of pixels whose grayscale values have not been defined.

The displacement detectors 10-1 to 10-M, aligned image generators 20-1 to 20-M, and combiner 30 will be described below in detail.

As described above, each displacement detector 10-m of the displacement detectors 10-1 to 10-M detects, for each pixel Dami in the reference image Dam, the displacement Dbmi relative to the base image Da0. The displacement Dbmi indicates a relative value of the position of a portion corresponding to the pixel Dami on the base image Da0 relative to the position of the pixel Dami in the reference image Dam, i.e., a motion.

In detecting the displacement Dbmi, for example, the displacement detector 10-*m* sets a matching region centered on the pixel Dami in the reference image Dam, sets multiple regions subjected to matching at different positions in the base image Da0, calculates a correlation (similarity) between each of the multiple regions subjected to matching and the matching region, determines a region subjected to matching having the highest correlation (similarity), and outputs, as the displacement Dbmi, a relative position of the determined region subjected to matching relative to the matching region. However, when the correlations of all the regions subjected to matching are less than a predetermined lower limit, it is determined that "no correspondence is established," i.e., "the displacement is undefined."

Each displacement detector 10-*m* sequentially selects (scans) all the pixels in the reference image Dam and performs the above process on the selected pixel, thereby obtaining, for each pixel Dami in the reference image Dam, the displacement Dbmi relative to the base image Da0.

"Sequentially selects" does not necessarily require selecting a pixel at a time, and it is also possible to select multiple pixels at a time and perform the above process on the selected multiple pixels in parallel. The same applies to the aligned image generators 20-1 to 20-M and combiner 30, described later.

Each aligned image generator 20-*m* of the aligned image generators 20-1 to 20-M generates the aligned image Dcm by, for each pixel Dami in the received reference image Dam, moving the pixel Dami according to the displacement Dbmi for the pixel Dami, associating the pixel (pixel before the movement) Dami with a pixel position closest to the position of the moved pixel, and assigning the grayscale value of the pixel Dami to the pixel position. The pixel before the movement is also referred to as the pixel before the alignment.

The aligned image Dcm thus generated is an image having the same viewpoint as the base image Da0. Here, the image having the same viewpoint is an image obtained when the imager 2 and object are not moving relatively to each other.

The aligned image Dcm includes pixels with which two or more pixels in the reference image Dam are associated. In this case, as the grayscale value of a pixel in the aligned image, an average value of the grayscale values of the multiple pixels associated with the pixel is determined.

The aligned image Dcm also includes pixels to which none of the grayscale values of the pixels in the reference image Dam are assigned since the reference image Dam includes no pixels serving as alignment sources for the pixels in the aligned image Dcm, i.e., no pixels assigned to the pixels in the aligned image Dcm, and thus whose grayscale values are not defined.

A pixel whose grayscale value has not been defined will be referred to as an undefined pixel. On the other hand, a pixel whose grayscale value has been defined will be referred to as a defined pixel.

The displacements and aligned images will be described with reference to FIGS. 3*a* to 3*c*. FIG. 3*a* illustrates a reference image Dam, FIG. 3*b* illustrates the displacements Dbmi between the reference image Dam and the base image Da0, and FIG. 3*c* illustrates the aligned image Dcm.

In FIG. 3*a*, each pixel in the reference image Dam is represented by a white circle. In FIG. 3*b*, the position of each pixel Dami in the reference image Dam is represented by a black dot, the positions of portions corresponding to the pixels Dami in the base image Da0 are represented by white circles, and the displacements Dbmi are represented by arrows.

Figure 3B:
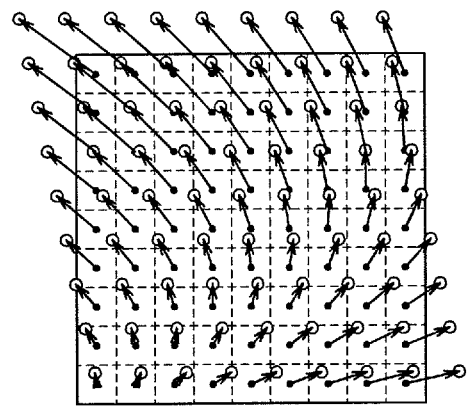
Figure 3A:
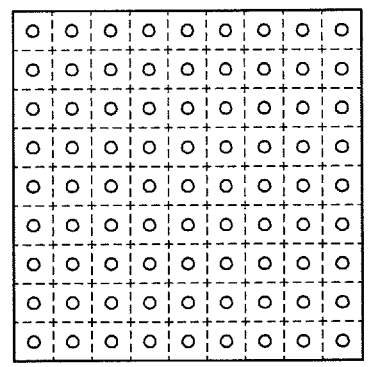

As shown by the arrows in FIG. 3*b*, the displacements Dbmi are represented as vectors from the positions (black dots) of the respective pixels Dami in the reference image Dam to the positions (white circles) of the portions corresponding to the pixels Dami in the base image Da0.

FIG. 3*c* illustrates the aligned image Dcm. The pixel positions in the aligned image Dcm are the same as the pixel positions in the base image Da0. The aligned image Dcm is generated by, for each pixel Dami in the reference image Dam, virtually moving the pixel Dami according to the displacement Dbmi and assigning the grayscale value of the pixel Dami to a pixel position closest to the position of the moved pixel. In FIG. 3*c*, the positions to which the pixels Dami in the reference image Dam have been moved are represented by white circles. Each pixel position in the aligned image Dcm is located at a center of a cell (rectangular region). The pixel position closest to an arbitrary position in the cell centered on each pixel position is the pixel position located at the center of the cell.

In FIG. 3*c*, pixels (without hatching) in the aligned image Dcm whose cell (the rectangular region centered on the pixel) includes one or more (centers of) white circles become defined pixels; pixels (indicated by hatching) whose cell includes no (centers of) white circles become undefined pixels. As such, of the pixel positions in the aligned image Dcm, pixels that have no pixels serving as alignment sources in the reference image Dam, and thus have no pixels assigned to the pixels in the reference image Dam, and thus have not had their grayscale values defined are undefined pixels.

When multiple images having different viewpoints are combined, it is required to perform geometric deformation, such as affine transformation or projective transformation. As shown in the example of FIGS. 3*a* to 3*c*, when geometric deformation is performed, undefined pixels are caused in the image after the deformation due to ununiformity in pixel sampling density.

Imaging a deep object from different viewpoints produces a portion (hidden region) appearing in the base image Da0 but hidden in a reference image. In the hidden region, no correspondence is established in the displacement detection, resulting in undefined pixels.

Each aligned image generator 20-*m* sequentially selects all the pixels in the received reference image Dam and performs, for the selected pixel, the above process of assigning the grayscale value. Each aligned image generator 20-*m* performs the process on all the pixels, thereby generating the aligned image Dcm, in which the grayscale values of at least a subset of the pixels have been defined.

The combiner 30 generates the combined image Dg by combining the base image Da0 and M aligned images Dc1 to DcM. The combiner 30 takes each pixel in the base image Da0 as a pixel Da0*i* of interest, and calculates the grayscale value of a pixel Dg*i* at the same position as the pixel Da0*i* of interest in the combined image Dg, by performing a process including weighted summation of the grayscale value of the pixel Da0*i* of interest and the grayscale values of pixels Dc1*i* to DcM*i* at the same position as the pixel Da0*i* of interest in the aligned images Dc1 to DcM. This weighted summation may be performed excluding undefined pixels or after interpolating undefined pixels.

The combiner 30 sequentially selects, as the pixel Da0*i* of interest, the pixels constituting the base image Da0, and performs the above weighted summation on the pixel Da0i of interest, thereby generating the combined image Dg, in which the grayscale values of all the pixels have been defined.

Figure 4:
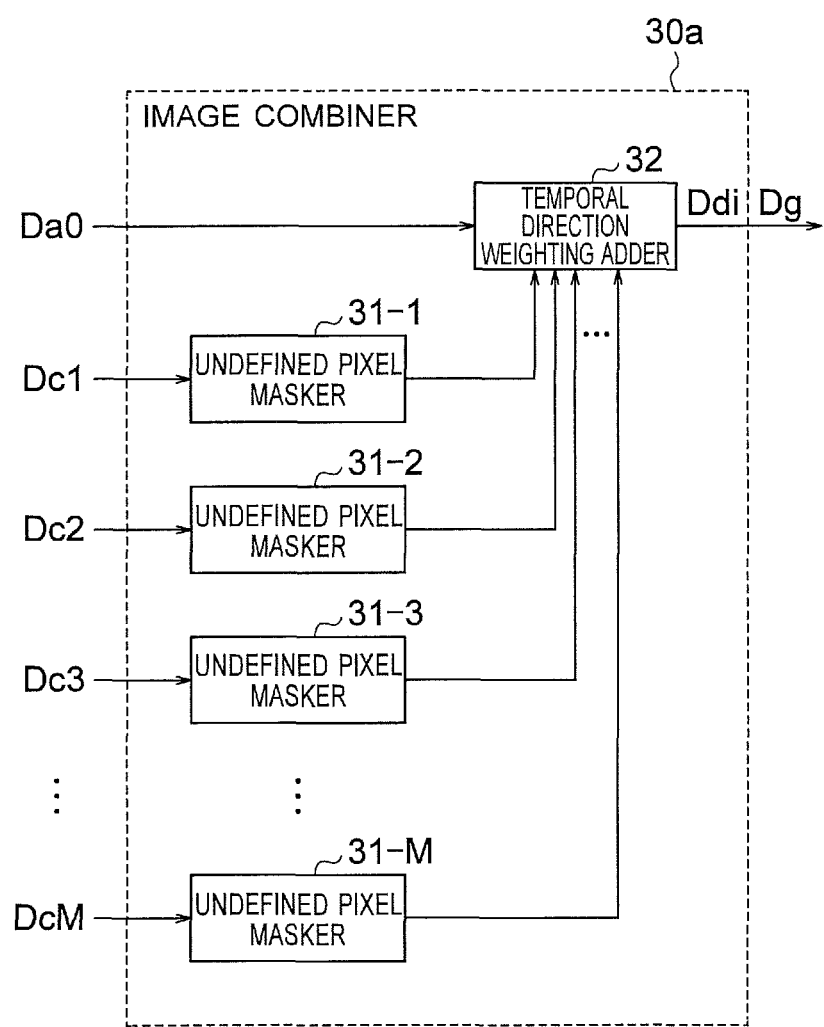
FIG. 4 is a block diagram illustrating an exemplary configuration of a combiner of FIG. 1.
Figure 5:
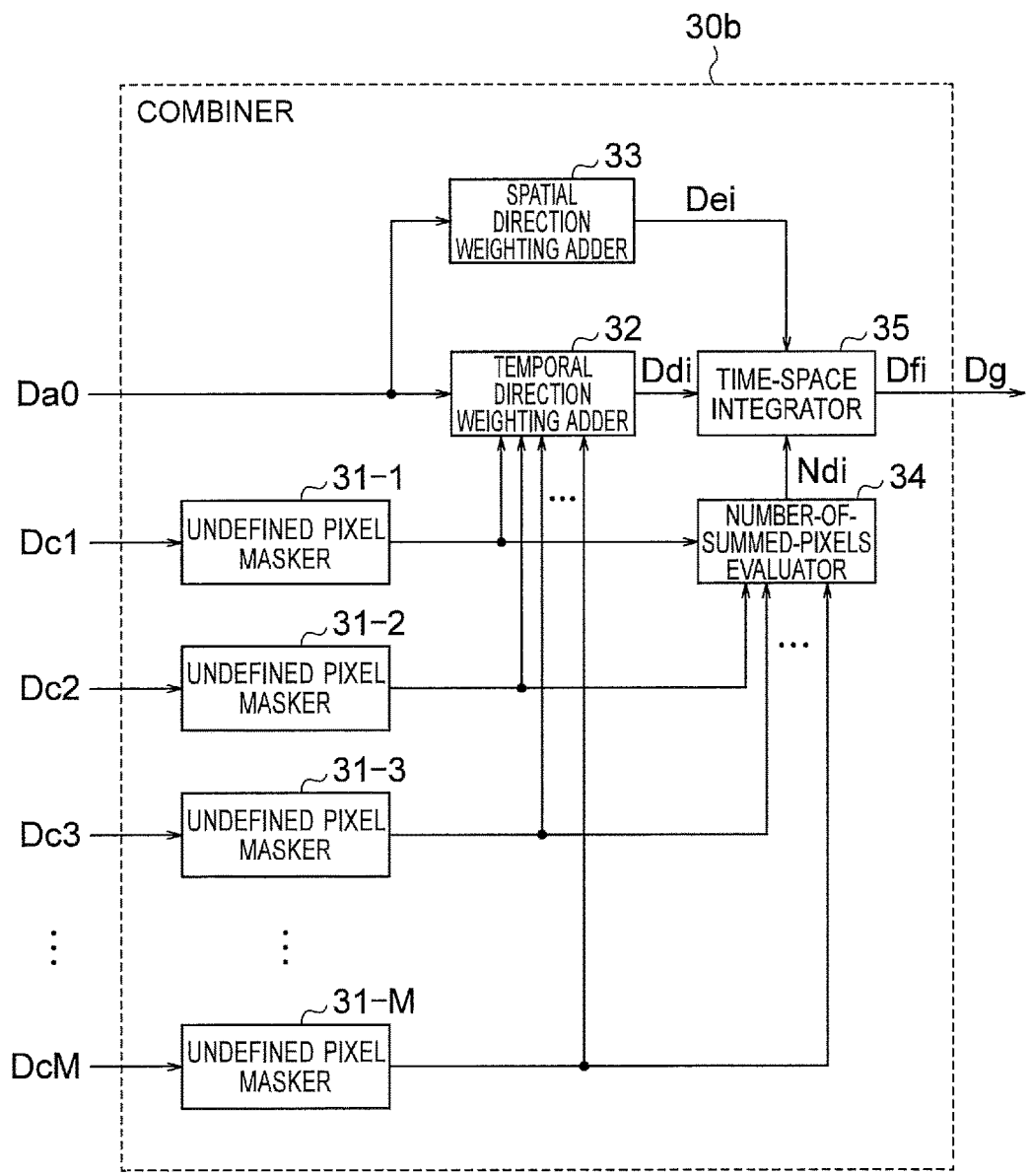
FIG. 5 is a block diagram illustrating another exemplary configuration of the combiner of FIG. 1.
Figure 6:
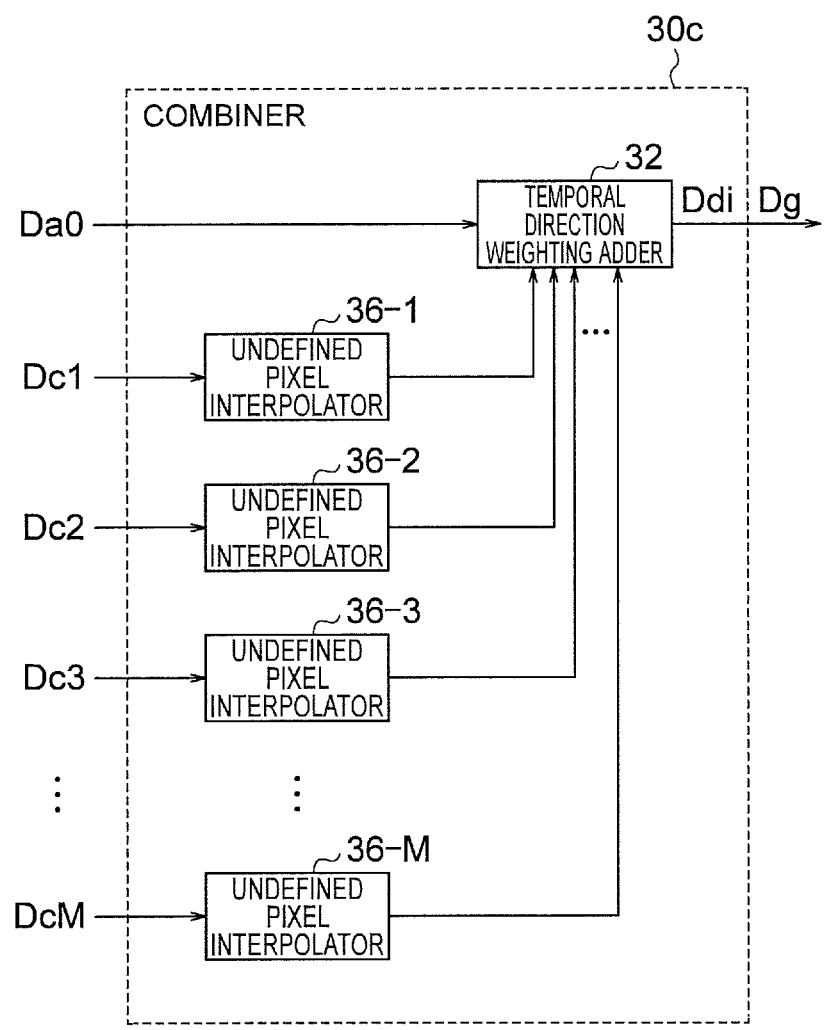
FIG. 6 is a block diagram illustrating still another exemplary configuration of the combiner of FIG. 1.

As the combiner 30, for example, a combiner 30a (first exemplary configuration) illustrated in FIG. 4, a combiner 30b (second exemplary configuration) illustrated in FIG. 5, and a combiner 30c (third exemplary configuration) illustrated in FIG. 6 may be used.

The combiner 30a illustrated in FIG. 4 takes each pixel in the base image Da0 as the pixel Da0i of interest, and calculates a temporal direction sum Ddi for the pixel Da0i of interest by weighting and summing the grayscale value of the pixel Da0i of interest and the grayscale values of defined pixels of the pixels Dc1i to DcMi at the same position as the pixel Da0i of interest in the aligned images Dc1 to DcM.

The combiner 30a includes M undefined pixel maskers 31-1 to 31-M that respectively mask undefined pixels in the aligned images Dc1 to DcM, and a temporal direction weighting adder 32 that weights and sums the grayscale value of the pixel Da0i of interest and the grayscale values of the pixel Dc1i to DcMi at the same position as the pixel Da0i of interest in the aligned images Dc1 to DcM.

The undefined pixel maskers 31-1 to 31-M mask Undefined pixels in the aligned images Dc1 to DcM. The process of masking undefined pixels is a process for preventing the subsequent temporal direction weighting adder 32 from using the undefined pixels in the summation, and is performed by, for example, preventing output of the grayscale values of the undefined pixels in the aligned images Dc1 to DcM. Instead, it is also possible to output, for each pixel in each aligned image Dcm, information (undefined pixel masking information) for identifying whether the pixel is an undefined pixel.

The temporal direction weighting adder 32 performs weighted summation (temporal direction weighted summation) of the grayscale value of the pixel Da0i of interest and the grayscale values of defined pixels of the pixels Dc1i to DcMi at the same position as the pixel Da0i of interest in the aligned images Dc1 to DcM after the masking, thereby calculating the temporal direction sum Ddi for the pixel Da0i of interest. Here, no undefined pixels are used in the summation due to the effect of the undefined pixel maskers 31-1 to 31-M. At this time, it is also possible to discriminate undefined pixels from the undefined pixel masking information, and use the undefined pixels in the summation with the weights for the undefined pixels as zero. This is because using them in the summation with their weights as zero is equivalent to excluding them from the summation.

In the weighted summation, it is possible to use the same weight for the pixel Da0i of interest and pixels used in the summation in the aligned images, and it is also possible to use a weight for the pixel Da0i of interest, which is the largest, and weights for the pixels in the aligned images, which decrease as the differences in imaging time between the base image Da0 and the reference images corresponding to the respective aligned images increase. It is also possible to vary the weight for each pixel depending on a difference or similarity in grayscale value between the pixel in the base image Da0 and the pixel in the aligned image Dcm, like a process using a bilateral filter.

The temporal direction sum Ddi for the pixel Da0i of interest is output from the combiner 30a as the grayscale value of the pixel Dgi at the same position as the pixel Da0i of interest in the combined image Dg. The grayscale values of all the pixels Dg1 to DgI constitute the combined image Dg. The combiner 30a generates the combined image Dg in the manner as described above.

The weighted summation in the temporal direction weighting adder 32 can improve S/N. For example, when differences between the pixels used in the summation are zero, simply summing the grayscale values of L pixels increases, by L times, a signal component in a grayscale value. On the other hand, a noise component is increased by $\sqrt{L}$ times, and S/N is improved by $L/\sqrt{L}=\sqrt{L}$ times. When the weights in the weighted summation are different, S/N is improved depending on the sum of the weighting coefficients.

The combiner 30b illustrated in FIG. 5 takes each pixel in the base image Da0 as the pixel Da0i of interest, and weights and sums the grayscale value of the pixel Da0i of interest and the grayscale values of defined pixels of the pixels Dc1i to DcMi at the same position as the pixel Da0i of interest in the aligned images Dc1 to DcM, similarly to the combiner 30a of FIG. 4, and uses the result of the weighted summation for calculation of the grayscale value of the pixel Dgi at the same position as the pixel Da0i of interest in the combined image Dg. The combiner 30b differs from the combiner 30a of FIG. 4 in that it further weights and sums the grayscale value of the pixel Da0i of interest and the grayscale values of pixels peripheral to the pixel Da0i of interest in the base image Da0, and also uses the result of the weighted summation for the calculation of the grayscale value of the pixel Dgi at the same position as the pixel Da0i of interest in the combined image Dg.

The combiner 30b includes M undefined pixel maskers 31-1 to 31-M and a temporal direction weighting adder 32, similarly to the combiner 30a of FIG. 4, and further includes a spatial direction weighting adder 33, a number-of-summed-pixels evaluator 34, and a time-space integrator 35.

The undefined pixel maskers 31-1 to 31-M and temporal direction weighting adder 32 are the same as those of the combiner 30a of FIG. 4, so descriptions thereof will be omitted. Hereinafter, the spatial direction weighting adder 33, number-of-summed-pixels evaluator 34, and time-space integrator 35 will be described in detail.

The spatial direction weighting adder 33 performs weighted summation (spatial direction weighted summation) of the grayscale value of the pixel Da0i of interest and the grayscale values of pixels peripheral to the pixel Da0i of interest in the base image Da0, thereby calculating a spatial direction sum Dei for the pixel Da0i of interest.

In the weighted summation, it is possible to use the same weight for the pixel Da0i of interest and the peripheral pixels, and it is also possible to use a weight for the pixel Da0i of interest, which is the largest, and weights for the peripheral pixels, which decrease as the distances from the pixel Da0i of interest increase. It is also possible to vary the weight for each pixel depending on a difference or similarity in grayscale value between the pixel Da0i of interest and the peripheral pixel, like a process using a bilateral filter.

The number-of-summed-pixels evaluator 34 calculates a number-of-summed-pixels evaluation value Ndi for the pixel Da0i of interest on the basis of whether each of the pixels Dc1i to DcMi at the same position as the pixel Da0i of interest in the aligned images Dc1 to DcM is an undefined pixel.

The number-of-summed-pixels evaluation value Ndi indicates the number of pixels used in the weighted summation in the temporal direction weighting adder 32 or the sum of the weights used in the weighted summation.

For example, when the temporal direction weighting adder 32 simply sums the pixel Da0i of interest and defined pixels of the pixels Dc1i to DcMi at the same position as the pixel Da0i of interest in the aligned images Dc1 to DcM, it is possible to use, as the number-of-summed-pixels evaluation value Ndi, a value obtained by adding "1" to the number of defined pixels of the pixels Dc1i to DcMi at the same position as the pixel Da0i of interest in the aligned images Dc1 to DcM. The reason why "1" is added is because the pixel Da0i of interest is also used in the weighted summation.

When the temporal direction weighting adder 32 performs weighted summation, it is possible to use, as the number-of-summed-pixels evaluation value Ndi for the pixel Da0i of interest, a value corresponding to the sum (integrated value) of the weights used in the weighted summation for calculating the temporal direction sum Ddi for the pixel Da0i of interest. In this case, when the weight for the pixel Da0i of interest is "1", and for each of the pixels in the aligned images Dc1 to DcM, the weight is "1" if a difference from the pixel Da0i of interest is zero, and decreases as the difference increases, it is possible to use the sum (integrated value) of the weights as the number-of-summed-pixels evaluation value Ndi. This makes it possible to generate, as the number-of-summed-pixels evaluation value Ndi, a value indicating the effective number of pixels used in the summation in the temporal direction weighting adder 62.

The time-space integrator 35 weights the temporal direction sum Ddi and spatial direction sum Dei for the pixel Da0i of interest with weights Wdi and Wei based on the number-of-summed-pixels evaluation value Ndi calculated for the pixel Da0i of interest, and sums the weighted sums, thereby calculating a three-dimensional sum Dfi for the pixel Da0i of interest.

In the weighting, when the number-of-summed-pixels evaluation value Ndi is large, the weight Wdi for the temporal direction sum Ddi is made large; when the number-of-summed-pixels evaluation value Ndi is small, the weight Wei for the spatial direction sum Dei is made large.

The three-dimensional sum Dfi for the pixel Da0i of interest is output from the combiner 30b as the grayscale value of the pixel Dgi at the same position as the pixel Da0i of interest in the combined image Dg. The grayscale values of all the pixels Dg1 to DgI constitute the combined image Dg. The combiner 30b generates the combined image Dg in the manner as described above.

The weighted summation in the temporal direction weighting adder 32, the weighted summation in the spatial direction weighting adder 33, and the weighted summation in the time-space integrator 35 can improve S/N. For example, when differences between the pixels used in the summation are zero, simply summing the grayscale values of L1 pixels in the temporal direction weighting adder 32, simply summing the grayscale values of L2 pixels in the spatial direction weighting adder 33, and simply summing the temporal direction sum Ddi and spatial direction sum Dei in the time-space integrator 35 increases, by (L1+L2) times, a signal component in the three-dimensional sum Dfi. On the other hand, a noise component is increased by $\sqrt{(L1+L2)}$ times, and S/N is improved by $(L1+L2)/\sqrt{(L1+L2)} = \sqrt{(L1+L2)}$ times. When the weights in the weighted summation are different, S/N is improved depending on the sum of the weighting coefficients.

The combiner 30c illustrated in FIG. 6 interpolates the grayscale values of undefined pixels in each image Dcm of the aligned images Dc1 to DcM using the grayscale values of peripheral pixels in the aligned image Dcm, takes each pixel in the base image Da0 as the pixel Da0i of interest, and calculates a temporal direction sum Ddi for the pixel Da0i of interest by weighting and summing the grayscale value of the pixel Da0i of interest and the grayscale values of the pixels Dc1i to DcMi at the same position as the pixel Da0i of interest in all the aligned images Dc1 to DcM.

The combiner 30c includes M undefined pixel interpolators 36-1 to 36-M that respectively interpolate undefined pixels in the aligned images Dc1 to DcM, and a temporal direction weighting adder 32 that weights and sums the grayscale value of the pixel Da0i of interest in the base image Da0 and the grayscale values of the pixels Dc1i to DcMi at the same position as the pixel Da0i of interest in the aligned images Dc1 to DcM.

The undefined pixel interpolators 36-1 to 36-M interpolate undefined pixels in the aligned images Dc1 to DcM. The grayscale value of an undefined pixel is interpolated by estimating it from the grayscale values of pixels peripheral to the pixel to be interpolated. For example, it is possible to determine, as the value of the pixel to be interpolated, a weighted sum of the grayscale values of eight pixels neighboring the pixel to be interpolated. The weights in the weighted summation in the interpolation may be adaptively changed depending on an edge direction or whether a peripheral pixel is an undefined pixel.

The temporal direction weighting adder 32 calculates the temporal direction sum Ddi for the pixel of interest by weighting and summing the grayscale value of the pixel Da0i of interest and the grayscale values of the pixels Dc1i to DcMi at the same position as the pixel Da0i of interest in all the aligned images Dc1 to DcM. Since the grayscale values of the undefined pixels in the aligned images Dc1 to DcM have been interpolated by the undefined pixel interpolators 36-1 to 36-M, all the pixels in the aligned images Dc1 to DcM are used in the weighted summation in the temporal direction weighting adder 32.

In the weighted summation, it is possible to weight the pixel Da0i of interest and the pixels in the aligned images Dc1 to DcM with the same weight, and it is also possible to weight the pixel Da0i of interest with the largest weight, and weight the pixels in the aligned images Dc1 to DcM with weights that decrease as the differences in imaging time between the base image Da0 and the reference images corresponding to the respective aligned images increase. It is also possible to vary the weight for each pixel depending on a difference or similarity in grayscale value between the base image Da0 and the aligned image Dcm, like a process using a bilateral filter.

Further, it is also possible to evaluate, for each undefined pixel, the reliability of the interpolation result in each undefined pixel interpolator 36-m of the undefined pixel interpolators 36-1 to 36-M, and change the weight for the aligned image Dcm on the basis of the reliabilities of the interpolation results. For example, when peripheral pixels are defined pixels or when an image pattern is not complicated, it is possible to determine that the reliability of an interpolation result is high. When it is determined that the reliability of an interpolation result is high, the weight for the aligned image Dcm is made large. When most peripheral pixels are undefined pixels or when an image pattern is complicated, it is possible to determine that the reliability of an interpolation result is low. When it is determined that the reliability of an interpolation result is low, the weight for the aligned image Dcm is made small.

The temporal direction sum Ddi for the pixel Da0i of interest is output from the combiner 30c as the grayscale value of the pixel Dgi at the same position as the pixel Da0i of interest in the combined image Dg. The grayscale values of all the pixels Dg1 to DgI constitute the combined image Dg. The combiner 30c generates the combined image Dg in the manner as described above.

The weighted summation in the temporal direction weighting adder 32 can improve S/N. For example, when the accuracy of the interpolation is high and differences between the pixels used in the summation are zero, simply summing the grayscale values of L pixels increases, by L times, a signal component in a grayscale value. On the other hand, a noise component is increased by $\sqrt{L}$ times, and S/N is improved by $L/\sqrt{L}=\sqrt{L}$ times.

Since the combiner 30c performs the weighted summation after performing the interpolation on all the aligned images, L, described above, is equal to N.

When the weights in the weighted summation are different, S/N is improved depending on the sum of the weighting coefficients.

Advantages of the image processing device of the first embodiment will now be described.

In the image processing device of the first embodiment, one of the multiple input images is taken as the base image Da0, and the other images are taken as the one or more reference images Da1 to DaM. The one or more displacement detectors 10-1 to 10-M each detect, for each pixel in the received reference image Dam, the displacement Dbmi relative to the base image Da0. Further, the one or more aligned image generators 20-1 to 20-M each generate the aligned image from the received reference image Dam. Then, the combiner 30 combines the base image Da0 and the one or more aligned images Dc1 to DcM generated by the one or more aligned image generators 20-1 to 20-M. Each aligned image generator 20-m of the aligned image generators 20-1 to 20-M generates the aligned image Dcm in which the grayscale values of at least a subset of the pixels have been defined, by, for each pixel Dami in the received reference image, moving the pixel Dami according to the displacement Dbmi for the pixel Dami and assigning the grayscale value of the pixel Dami to a pixel position closest to the position of the moved pixel. The combiner 30 calculates the grayscale value of the pixel Dgi at the same position as the pixel Da0i of interest in the combined image Dg by performing the combination by performing the weighted summation using weights depending on whether each pixel in each of the one or more aligned images Dc1 to DcM is a defined pixel, or by performing the weighted summation after interpolating undefined pixels.

Thus, even when it is difficult to obtain multiple images having the same viewpoint due to constraints on imaging, e.g., when the imager 2 is moving fast, by summing the grayscale values of multiple pixels after alignment between different images, it is possible to average random noise and improve S/N.

Further, since the aligned images Dc1 to DcM are generated without resampling processing and the grayscale values of the pixels in the reference images can be directly used in the combination, it is possible to avoid the problem in that a high frequency component is deteriorated due to the frequency characteristic of a kernel used in the resampling, and generate the combined image Dg with high sharpness and without aliasing distortion.

Further, the combiner 30a illustrated in FIG. 4 performs weighted summation using the pixels Da0i and Dc1i to DcMi at the same position in the base image Da0 and aligned images Dc1 to DcM. Since all the grayscale values of the pixels in the base image Da0 are defined, the combined image Dg lacks no pixel. Further, since no weighted summation in the spatial direction is performed, it is possible to improve S/N by an amount corresponding to the number of defined pixels in the aligned images Dc1 to DcM without reducing image sharpness.

Further, when the temporal direction weighting adder 32 is configured to change the weight for each pixel depending on the difference or similarity in grayscale value between the base image Da0 and the aligned image Dcm, it is possible to achieve an effect similar to that obtained by preferentially selecting pixels having a high correlation with the pixel Da0i of interest in the base image Da0 from among the pixels of the respective aligned images Dc1 to DcM and using the selected pixels for the combination, and even when the displacements are inaccurate or when there are hidden regions or the like, prevent generation of an image obtained by overlaying images displaced from each other, and obtain a sharp image.

The combiner 30b illustrated in FIG. 5 uses weighted summation (temporal direction weighted summation) using the pixels Da0i and Dc1i to DcMi at the same position in the base image Da0 and aligned images Dc1 to DcM, and weighted summation (spatial direction weighted summation) using each pixel (pixel of interest) in the base image Da0 and its peripheral pixels.

It determines, by the number-of-summed-pixels evaluator 34, the number-of-summed-pixels evaluation value Ndi indicating the number of pixels used in the weighted summation in the temporal direction weighting adder 32 or the sum of the weights used in the weighted summation, and makes the weight for the temporal direction sum Ddi large when the number-of-summed-pixels evaluation value Ndi is large, and makes the weight for the spatial direction sum Dei large when the number-of-summed-pixels evaluation value Ndi is small.

Thereby, when there are many undefined pixels and it is not possible to add a sufficient number of defined pixels in the temporal direction, by generating the combined image Dg while weighting the result of the summation in the spatial direction with a larger weight, it is possible to equalize the number of pixels used in the summation (effective number of pixels used in the summation in consideration of the weights) between the pixels, and equalize the S/N improvement effect.

Further, when the temporal direction weighting adder 32 is configured to change the weight for each pixel depending on the difference or similarity in grayscale value between the pixels at the same position in the base image Da0 and aligned image Dcm, the number-of-summed-pixels evaluator 34 uses the sum of the weights as the number-of-summed-pixels evaluation value Ndi. In this case, in a case where it is not possible to sufficiently perform addition in the temporal direction when there are no undefined pixels but the displacements are inaccurate, or in a case where it is not possible to sufficiently perform addition in the temporal direction when there are hidden regions or the like, the sum of the weights is small. In such a case, by making the weight for the result of the summation in the spatial direction large, it is possible to equalize the number of pixels used in the summation (effective number of pixels used in the summation in consideration of the weights) between the pixels, and equalize the S/N improvement effect.

The combiner 30c illustrated in FIG. 6 interpolates the grayscale values of undefined pixels in the aligned images Dc1 to DcM using the grayscale values of their peripheral pixels. This makes it possible to sum the pixels in the base image Da0 and all the pixels in the aligned images Dc1 to DcM. Thus, it is possible to equalize the number of pixels used in the summation and equalize the S/N improvement effect.

As described above, according to the image processing device of the first embodiment of the present invention, it is possible to solve the problem caused by image deformation processing and generate a high quality combined image even when input images have different viewpoints.

Second Embodiment

Figure 7:
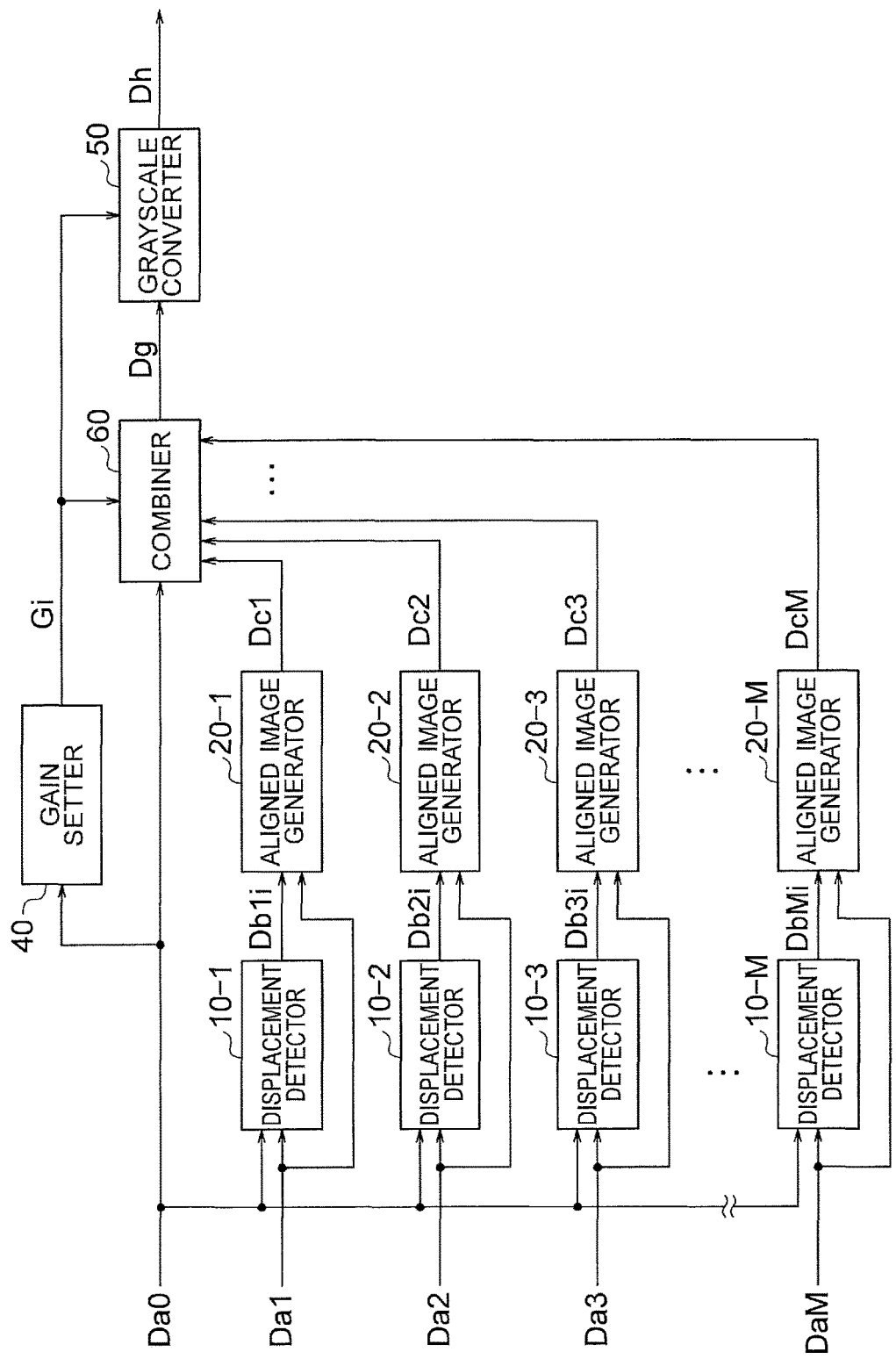
FIG. 7 is a block diagram illustrating an image processing device of a second embodiment of the present invention.

FIG. 7 illustrates an image processing device of a second embodiment of the present invention. The image processing device of the second embodiment combines N input images to generate a single combined image, and can be used as the image processing device 6 of FIG. 2, as in the first embodiment.

The image processing device of the second embodiment includes M displacement detectors 10-1 to 10-M, M aligned image generators 20-1 to 20-M, a combiner 60, a gain setter 40, and a grayscale converter 50.

The displacement detectors 10-1 to 10-M and aligned image generators 20-1 to 20-M are the same as those of the first embodiment.

The gain setter 40 sets a gain Gj (j is an integer from 0 to J, and J is the maximum of the grayscale values) for each grayscale value on the basis of a grayscale characteristic or grayscale value distribution of the base image Da0. Further, when each pixel of the base image Da0 is processed as the pixel Da0$i$ of interest by the combiner 60 and grayscale converter 50, the gain setter 40 determines and outputs, as a gain Gi for the pixel Da0$i$ of interest, the gain Gj set for the grayscale value of the pixel Da0$i$ of interest.

The combiner 60 generates a combined image Dg by combining the base image Da0 and aligned images Dc1 to DcM using the gain Gi for the pixel Da0$i$ of interest output from the gain setter 40 when each pixel is processed as the pixel Da0$i$ of interest.

The grayscale converter 50 generates a grayscale-converted image (output image) Dh by converting the grayscale values of the combined image Dg using the gain Gi for the pixel Da0$i$ of interest output from the gain setter 40 when each pixel is processed as the pixel Da0$i$ of interest.

As described above, the gain setter 40 sets the gain Gj for each grayscale value on the basis of the grayscale characteristic of the base image Da0. The gain Gj for each grayscale value is set so that the grayscale conversion characteristic determined by the gains Gj compresses the dynamic range of the base image Da0. Specifically, the characteristic is preferably one in which gains Gj for a dark portion are large and gains Gj for a bright portion are near "1". In particular, for an input image obtained by imaging a scene in which a grayscale difference between a bright portion and a dark portion is large, the gains Gj are set so that gains Gj for a dark portion are larger.

Figure 8A:
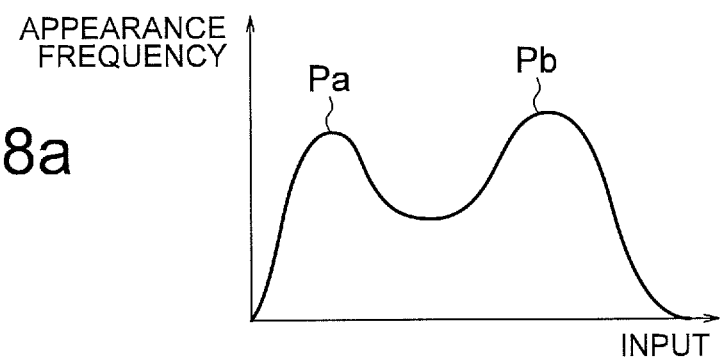
FIGS. 8a and 8b are diagrams illustrating an example of a grayscale value distribution, and a grayscale conversion characteristic applied thereto.
Figure 8B:
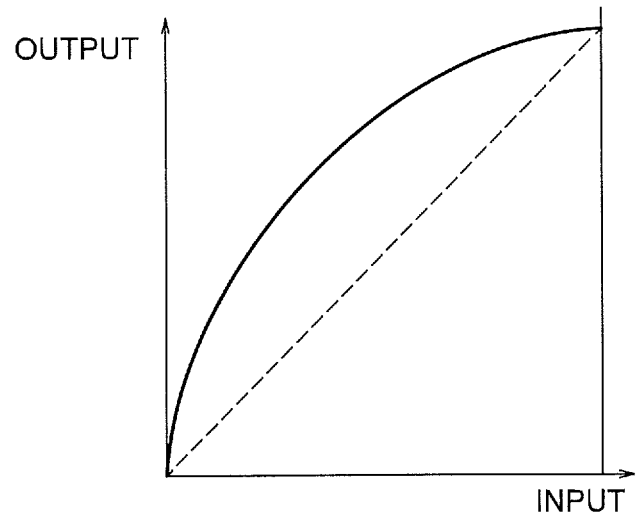

The second embodiment assumes a case where the imager 2 performs imaging with a short exposure time in a scene having a wide dynamic range so as to prevent saturation of grayscale values in a portion corresponding to a bright object. In this case, the grayscale value distribution (brightness distribution) of an input image has peaks Pa and Pb in a low grayscale region and a high grayscale region, as illustrated in FIG. 8$a$. The exposure time is controlled by the controller 8.

When an input image has a grayscale value distribution illustrated in FIG. 8$a$, the gains Gj are set to have an overall grayscale conversion characteristic as illustrated in FIG. 8$b$.

In the grayscale conversion characteristic of FIG. 8$b$, the gain Gj is maximum at the darkest portion, gradually decreases as the grayscale value increases, and approaches "1" as the grayscale value approaches its maximum.

Figure 9A:
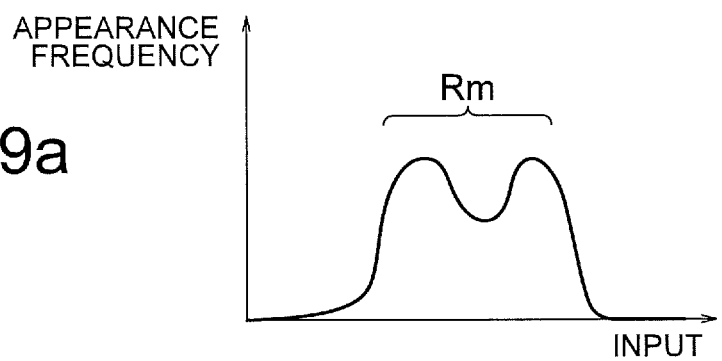
FIGS. 9a and 9b are diagrams illustrating another example of a grayscale value distribution, and a grayscale conversion characteristic applied thereto.
Figure 9B:
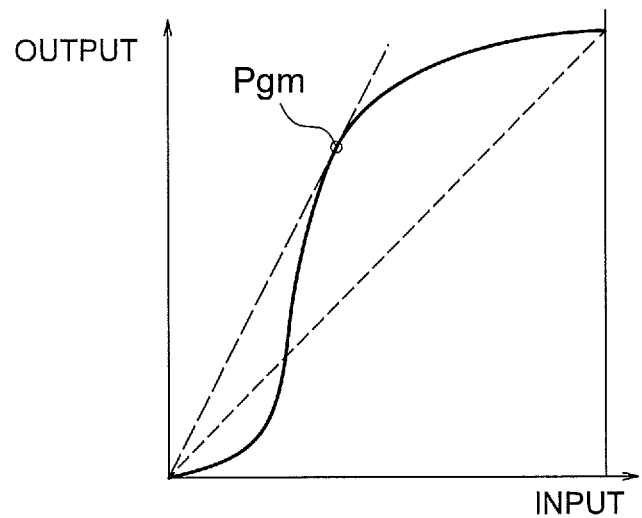

On the other hand, when the grayscale value distribution is concentrated in an intermediate grayscale region Rm as illustrated in FIG. 9$a$, the grayscale conversion characteristic is set so that the gain Gj is small in a low grayscale region, is maximum near a lower end (left end in the drawing) of the intermediate grayscale region (range in which the grayscale value distribution is concentrated), as illustrated in FIG. 9$b$, (the point at which the gain Gj is maximum is indicated by reference character Pgm), and approaches "1" as the grayscale value approaches its maximum in a high grayscale region.

As such, it is preferable to adjust the gain Gj depending on the grayscale characteristic or grayscale value distribution.

The combiner 60 generates the combined image Dg by combining the base image Da0 and M aligned images Dc1 to DcM. The combiner 60 takes each pixel in the base image Da0 as the pixel Da0$i$ of interest, and calculates the grayscale value of the pixel Dgi at the same position as the pixel Da0$i$ of interest in the combined image Dg, by performing a process including weighted summation of the grayscale value of the pixel Da0$i$ of interest and the grayscale values of the pixels Dc1$i$ to DcMi at the same position as the pixel Da0$i$ of interest in the aligned images Dc1 to DcM. The weighted summation may be performed excluding undefined pixels or after interpolating undefined pixels. In the above points, the combiner 60 is the same as the combiner 30 of the first embodiment.

On the other hand, the combiner 60 differs from the combiner 30 of the first embodiment in that it controls, for each pixel, the number of pixels used in the weighted summation or the weights in the weighted summation, on the basis of the gain Gi for the pixel Da0$i$ of interest output from the gain setter 40. Specifically, when performing the combining process on each pixel Da0$i$ in the base image Da0, the combiner 60 determines, for the pixel Da0$i$ (for calculation of the grayscale value of the pixel Dgi in the combined image Dg corresponding to the pixel Da0$i$), the number of pixels used in the weighted summation or the weights in the weighted summation, using the gain Gi output from the gain setter 40 according to the grayscale value of the pixel Da0$i$ of interest.

Figure 10:
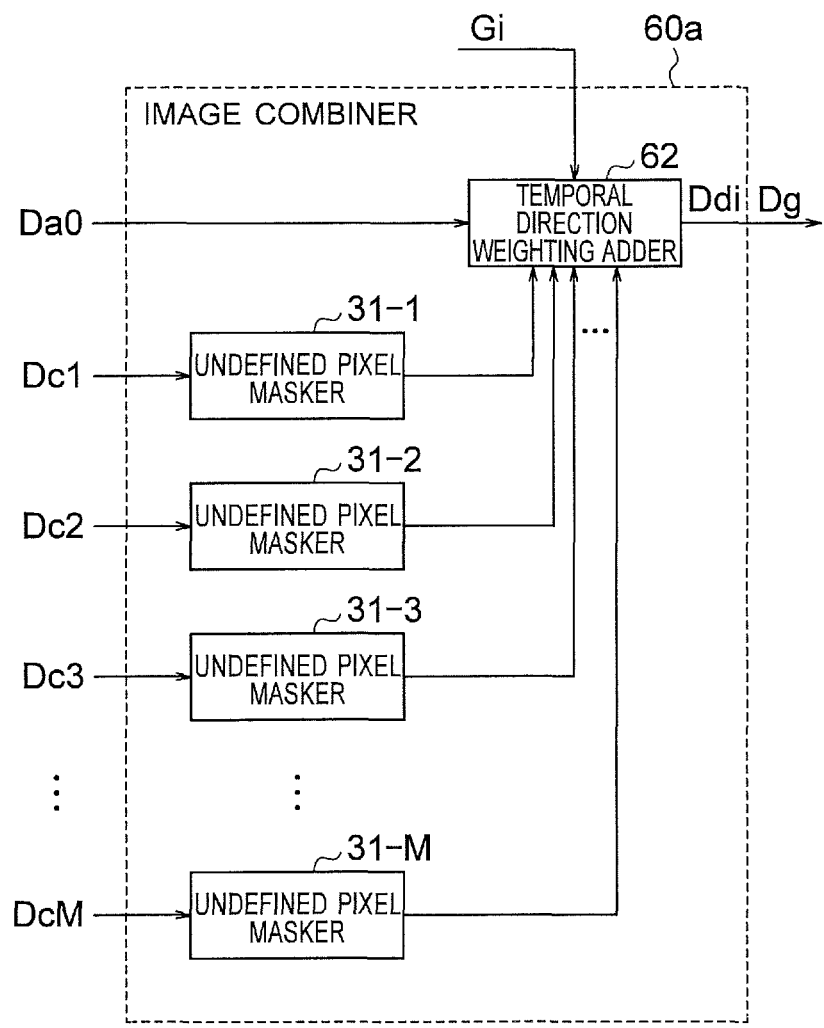
FIG. 10 is a block diagram illustrating an exemplary configuration of a combiner of FIG. 7.
Figure 11:
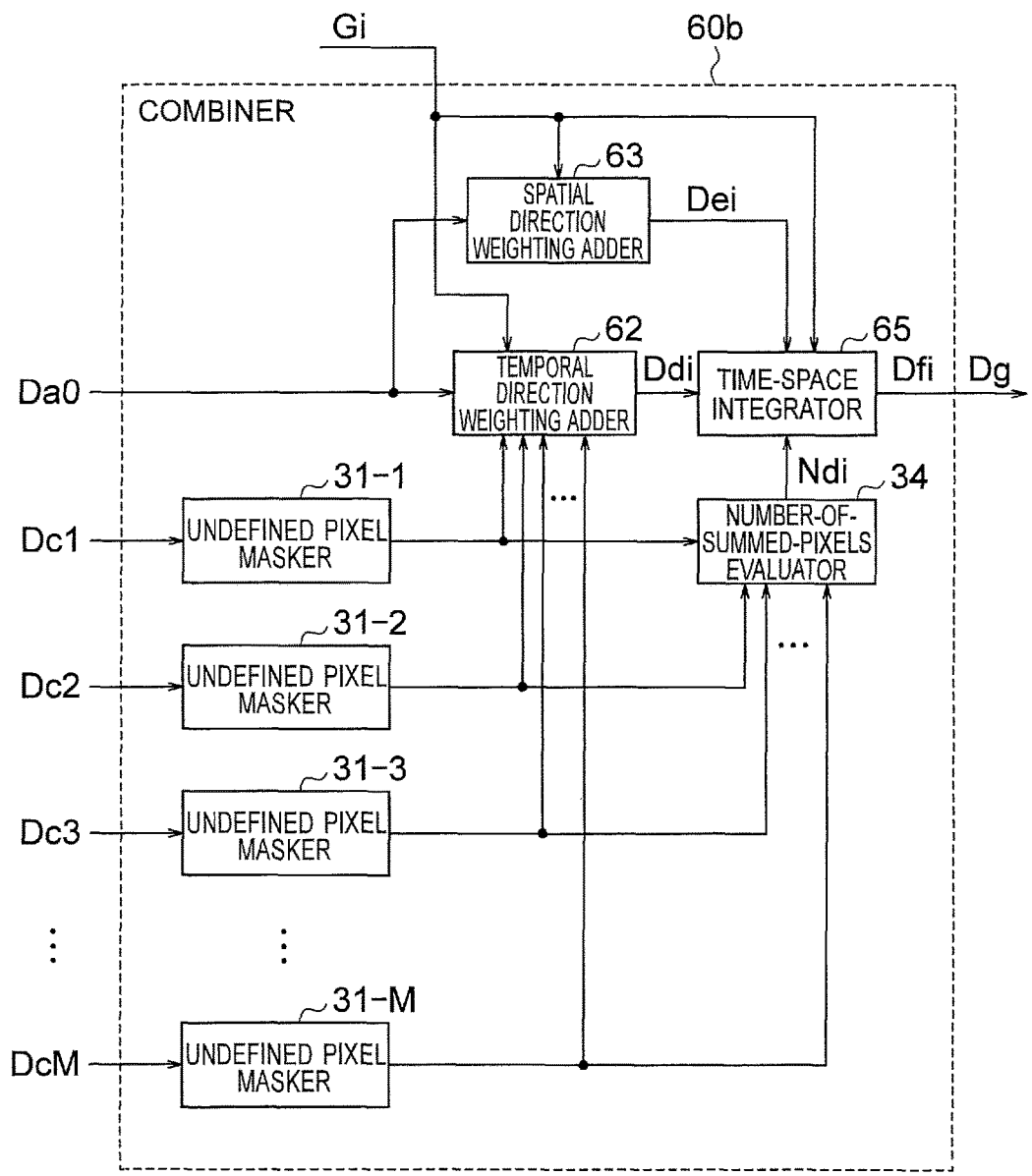
FIG. 11 is a block diagram illustrating another exemplary configuration of the combiner of FIG. 7.
Figure 12:
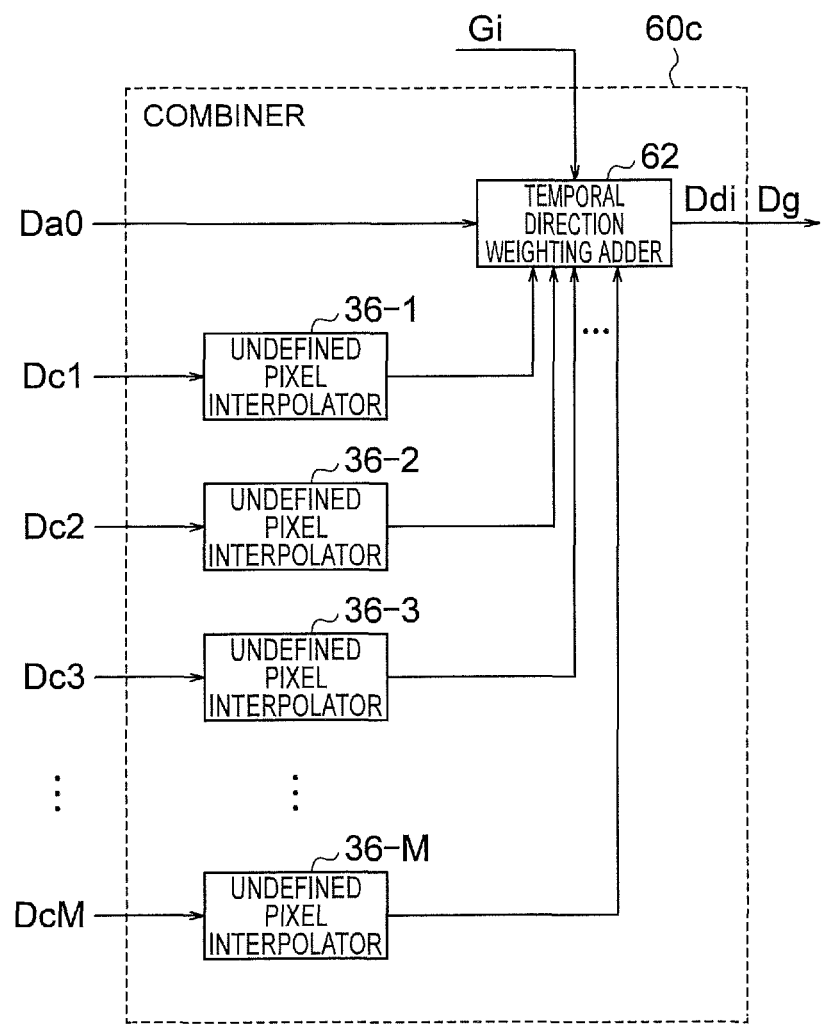
FIG. 12 is a block diagram illustrating still another exemplary configuration of the combiner of FIG. 7.

As the combiner 60, for example, a combiner 60$a$ (first exemplary configuration) illustrated in FIG. 10, a combiner 60$b$ (second exemplary configuration) illustrated in FIG. 11, and a combiner 60$c$ (third exemplary configuration) illustrated in FIG. 12 may be used.

The combiner 60$a$ illustrated in FIG. 10 calculates a temporal direction sum Ddi for the pixel Da0$i$ of interest by weighting and summing the grayscale value of the pixel Da0$i$ of interest and the grayscale values of defined pixels of the pixels Dc1$i$ to DcMi at the same position as the pixel Da0$i$ of interest in the aligned images Dc1 to DcM, similarly to the combiner 30$a$ of FIG. 4.

The combiner 60$a$ includes M undefined pixel maskers 31-1 to 31-M that respectively mask undefined pixels in the aligned images Dc1 to DcM, and a temporal direction weighting adder 62 that weights and sums the grayscale value of the pixel Da0$i$ of interest and the grayscale values of defined pixels of the pixels Dc1$i$ to DcMi at the same position as the pixel Da0$i$ of interest in the aligned images Dc1 to DcM.

The undefined pixel maskers 31-1 to 31-M are the same as those in the combiner 30a of FIG. 4.

The temporal direction weighting adder 62 calculates the temporal direction sum Ddi for the pixel Da0i of interest by performing weighted summation (temporal direction weighted summation) of the grayscale value of the pixel Da0i of interest and the grayscale values of defined pixels of the pixels Dc1i to DcMi at the same position as the pixel Da0i of interest in the aligned images Dc1 to DcM, similarly to the temporal direction weighting adder 32 in the combiner 30a of FIG. 4.

However, the number of defined pixels used in the weighted summation is determined on the basis of the gain Gi for the pixel Da0i of interest output from the gain setter 40. Specifically, the number of pixels used in the summation is made large when the gain Gi for the pixel Da0i of interest is large, and the number of pixels used in the summation is made small when the gain Gi is small.

In changing the number of pixels used in the summation, for example, it is possible to determine the priorities on the basis of the differences in imaging time, or the differences or similarities in grayscale value, and select pixels in descending order of priority. When the priorities are determined on the basis of the differences in imaging time, the priority is higher as the difference in imaging time is smaller. When the priorities are determined on the basis of the differences or similarities in grayscale value, the priority is higher as the difference is smaller or the similarity is higher.

The temporal direction sum Ddi for the pixel Da0i of interest is output from the combiner 60a as the grayscale value of the pixel Dgi at the same position as the pixel Da0i of interest in the combined image Dg. The grayscale values of all the pixels Dg1 to DgI constitute the combined image Dg. The combiner 60a generates the combined image Dg in the manner as described above.

Using the combiner 60a provides the same advantages as using the combiner 30a of FIG. 4. Further, by changing, for each pixel, the number of pixels used for calculation of the temporal direction sum Ddi for the pixel on the basis of the gain Gi determined according to the grayscale value of the pixel, it is possible to improve S/N in a dark portion in an image, and reduce blur in a bright portion in the image by avoiding unnecessary weighted addition.

The combiner 60b illustrated in FIG. 11 takes each pixel in the base image Da0 as the pixel Da0i of interest, weights and sums the grayscale value of the pixel Da0i of interest and the grayscale values of defined pixels of the pixels Dc1i to DcMi at the same position as the pixel Da0i of interest in the aligned images Dc1 to DcM, similarly to the combiner 60a of FIG. 10, and uses the result of the weighted summation for calculation of the grayscale value of the pixel Dgi at the same position as the pixel Da0i of interest in the combined image Dg. The combiner 60b differs from the combiner 60a of FIG. 10 in that it further weights and sums the grayscale value of the pixel Da0i of interest and the grayscale values of pixels peripheral to the pixel Da0i of interest in the base image Da0, and also uses the result of the weighted summation for the calculation of the grayscale value of the pixel Dgi at the same position as the pixel Da0i of interest in the combined image Dg.

The combiner 60b includes M undefined pixel maskers 31-1 to 31-M and a temporal direction weighting adder 62, similarly to the combiner 60a of FIG. 10, and further includes a spatial direction weighting adder 63, a number-of-summed-pixels evaluator 34, and a time-space integrator 65.

The undefined pixel maskers 31-1 to 31-M, temporal direction weighting adder 62, and number-of-summed-pixels evaluator 34 are the same as the undefined pixel maskers 31-1 to 31-M and number-of-summed-pixels evaluator 34 of the combiner 60a of FIG. 10, so descriptions thereof will be omitted. Hereinafter, the spatial direction weighting adder 63 and time-space integrator 65 will be described in detail.

The spatial direction weighting adder 63 is similar to the spatial direction weighting adder 33 of the combiner 30b of FIG. 5, and performs weighted summation (spatial direction weighted summation) of the grayscale value of the pixel Da0i of interest and the grayscale values of pixels peripheral to the pixel Da0i of interest in the base image Da0, thereby calculating a spatial direction sum Dei for the pixel Da0i of interest.

However, the number of pixels used in the weighted summation is determined on the basis of the gain Gi for the pixel Da0i of interest output from the gain setter 40. Specifically, the number of pixels used in the summation is made large when the gain Gi for the pixel Da0i of interest is large, and the number of pixels used in the summation is made small when the gain Gi is small.

In changing the number of pixels used in the summation, for example, it is possible to determine the priorities on the basis of the distances from the pixel Da0i of interest, or the differences or similarities in grayscale value relative to the pixel Da0i of interest, and select pixels in descending order of priority. When the priorities are determined on the basis of the distances from the pixel Da0i of interest, the priority is higher as the distance from the pixel Da0i of interest is smaller. When the priorities are determined on the basis of the differences or similarities in grayscale value relative to the pixel Da0i of interest, the priority is higher as the difference is smaller or the similarity is higher.

The number of pixels used in the summation in the temporal direction weighting adder 62 and the number of pixels used in the summation in the spatial direction weighting adder 63 are changed in association with each other.

For example, when it is required to increase the total number of pixels used in the summations, it is preferable to preferentially increase the number of pixels used in the summation in the temporal direction weighting adder 62, and then, if there is shortage, increase the number of pixels used in the summation in the spatial direction weighting adder 63. Conversely, when it is required to decrease the total number of pixels used in the summations, it is preferable to preferentially decrease the number of pixels used in the summation in the spatial direction weighting adder 63, and then, if there is excess, decrease the number of pixels used in the summation in the temporal direction weighting adder 62.

The time-space integrator 65 weights the temporal direction sum Ddi and spatial direction sum Dei for the pixel Da0i of interest with weights Wdi and Wei according to the number-of-summed-pixels evaluation value Ndi calculated for the pixel Da0i of interest and sums the weighted sums, thereby calculating a three-dimensional sum Dfi for the pixel Da0i of interest, similarly to the time-space integrator 35 of the combiner 30b of FIG. 5.

However, the weights Wdi and Wei used in the weighted summation in the time-space integrator 65 for calculation of the three-dimensional sum Dfi for each pixel are determined on the basis of the number-of-summed-pixels evaluation value Ndi and gain Gi for the pixel. Specifically, when the gain Gi determined for each pixel is large and the number of pixels used in the summation by the spatial direction weighting adder 63 is increased, in response to this, the weight Wei for the spatial direction sum Dei is increased. Conversely, when the gain Gi is small and the number of pixels used in the summation by the spatial direction weighting adder 63 is decreased, in response to this, the weight Wdi for the temporal direction sum Ddi is increased.

More specifically, when the number of pixels used in the spatial direction weighted summation is denoted by Nei, the weighting coefficients Wdi and Wei in the weighted summation by the time-space integrator 65 may be determined so that the following relationship is satisfied:

$$Wdi:Wei=Ndi:Nei.$$

In the above formula, Ndi is the number-of-summed-pixels evaluation value Ndi.

The three-dimensional sum Dfi for the pixel Da0$i$ of interest is output from the combiner 60$b$ as the grayscale value of the pixel Dgi at the same position as the pixel Da0$i$ of interest in the combined image Dg. The grayscale values of all the pixels Dg1 to DgI constitute the combined image Dg. The combiner 60$b$ generates the combined image Dg in the manner as described above.

As above, using the combiner 60$b$ provides the same advantages as using the combiner 30$b$ of FIG. 5. Further, by changing, for each pixel, the number of pixels used in the summation for calculation of the temporal direction sum Ddi for the pixel and the number of pixels used in the summation for calculation of the spatial direction sum Dei for the pixel on the basis of the gain Gi determined according to the grayscale value of the pixel, it is possible to improve S/N in a dark portion in an image, and reduce sharpness deterioration or blur in a bright portion in the image by avoiding unnecessary weighted addition.

Further, by preferentially performing the weighted summation in the temporal direction, and then, if there is a shortage, performing the weighted summation in the spatial direction, it is possible to reduce sharpness deterioration.

The combiner 60$c$ illustrated in FIG. 12 interpolates the grayscale values of undefined pixels in each image Dcm of the aligned images Dc1 to DcM using the grayscale values of peripheral pixels in the aligned image Dcm, takes each pixel in the base image Da0 as the pixel Da0$i$ of interest, and calculates a temporal direction sum Ddi for the pixel Da0$i$ of interest by weighting and summing the grayscale value of the pixel Da0$i$ of interest and the grayscale values of all or a subset of the pixels Dc1$i$ to DcM$i$ at the same position as the pixel Da0$i$ of interest in the aligned images Dc1 to DcM, similarly to the combiner 30$c$ of FIG. 6.

The combiner 60$c$ includes M undefined pixel interpolators 36-1 to 36-M that respectively interpolate undefined pixels in the aligned images Dc1 to DcM, and a temporal direction weighting adder 62 that weights and sums the grayscale value of the pixel Da0$i$ of interest and the grayscale values of all or a subset of the pixels Dc1$i$ to DcM$i$ at the same position as the pixel Da0$i$ of interest in the aligned images Dc1 to DcM.

The undefined pixel interpolators 36-1 to 36-M are the same as the undefined pixel interpolators 36-1 to 36-M in the combiner 30$c$ of FIG. 6.

The temporal direction weighting adder 62 is similar to the temporal direction weighting adder 32 of the combiner 30$c$ of FIG. 6; however, it calculates the temporal direction sum Ddi for the pixel Da0$i$ of interest by weighting and summing the grayscale value of the pixel Da0$i$ of interest and the grayscale values of all or a subset of the pixels Dc1$i$ to DcM$i$ at the same position as the pixel Da0$i$ of interest in the aligned images Dc1 to DcM.

The number of pixels used in the weighted summation is determined on the basis of the gain Gi for the pixel Da0$i$ of interest output from the gain setter 40. Specifically, the number of pixels used in the summation is made large when the gain Gi for the pixel Da0$i$ of interest is large, and the number of pixels used in the summation is made small when the gain Gi is small.

In changing the number of pixels used in the summation, for example, it is possible to determine the priorities on the basis of whether they are interpolated pixels, the differences in imaging time, or the differences or similarities in grayscale value, and select pixels in descending order of priority. When the priorities are determined on the basis of the differences in imaging time, the priority is higher as the difference in imaging time is smaller. When the priorities are determined on the basis of the differences or similarities in grayscale value, the priority is higher as the difference is smaller or the similarity is higher.

The temporal direction sum Ddi for the pixel Da0$i$ of interest is output from the combiner 60$c$ as the grayscale value of the pixel Dgi at the same position as the pixel Da0$i$ of interest in the combined image Dg. The grayscale values of all the pixels Dg1 to DgI constitute the combined image Dg. The combiner 60$c$ generates the combined image Dg in the manner as described above.

Using the combiner 60$c$ provides the same advantages as using the combiner 30$c$ of FIG. 6. Further, by changing, for each pixel, the number of pixels used for calculation of the temporal direction sum Ddi for the pixel on the basis of the gain Gi determined according to the grayscale value of the pixel, it is possible to improve S/N in a dark portion in an image, and reduce blur in a bright portion in the image by avoiding unnecessary weighted addition.

As above, when the combiner 60$a$ illustrated in FIG. 10 or the combiner 60$c$ illustrated in FIG. 12 is used, for each pixel, the number of pixels used in the temporal direction weighted summation for calculation of the temporal direction sum Ddi for the pixel is controlled on the basis of the gain Gi determined according to the grayscale value of the pixel. Specifically, the number of pixels used in the summation in the temporal direction is made large when the gain Gi is large, and the number of pixels used in the summation in the temporal direction is made small when the gain Gi is small.

When the combiner 60$b$ of FIG. 11 is used, in addition to controlling the number of pixels used in the temporal direction weighted summation for calculation of the temporal direction sum Ddi for the pixel, when the gain Gi is large, the number of pixels used in the spatial direction weighted summation for calculation of the spatial direction sum Dei for the pixel is made large, and the time-space integrator 65 increases the weight for the spatial direction sum Dei and performs the weighted summation.

As such, when the combiner 60$b$ of FIG. 11 is used, if the gain Gi for the pixel Da0$i$ of interest is large, the number of pixels used in the summation is increased not only in the temporal direction but also in the spatial direction. Thus, when the gain Gi is large and it is not possible to sum a sufficient number of pixels in the temporal direction, it is possible to supplement the S/N improvement effect by the summation in the spatial direction.

The grayscale converter 50 calculates the grayscale value of a pixel Dhi at the same position as the pixel Da0$i$ of interest in the grayscale-converted image (output image) Dh, by converting the grayscale value of the combined image Dg on the basis of the gain Gi for the pixel Da0$i$ of interest output from the gain setter 40.

In the grayscale conversion, it is possible to simply multiply the grayscale value of each pixel Dgi in the combined image Dg by the gain Gi, and it is also possible to apply a dynamic range compression process based on the Retinex theory to the grayscale value of each pixel Dgi in the combined image Dg. In the latter case, the grayscale values in the combined image Dg are separated into base components (illumination light components) and detail components (reflected light components), which are recombined after applying grayscale conversion to only the base components according to the gains Gi and applying intensity adjustment to the detail components.

Specifically, the following method can be used.

Figure 13:
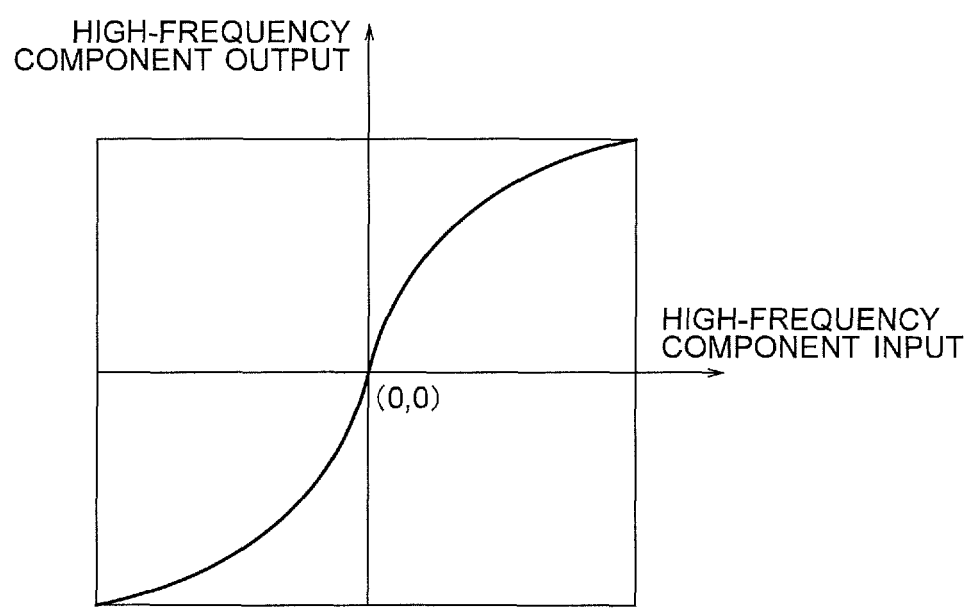
FIG. 13 is a diagram illustrating an example of a conversion characteristic for variations in grayscale values.

In the intensity adjustment, for example, high frequency components or variations (quadratic differentials) of the grayscale values are converted using the conversion characteristic illustrated in FIG. 13. This can emphasize the detail components with minute amplitudes.

In another method, the intensity adjustment may be performed by separating the grayscale values into low frequency components (base components) and high frequency components (detail components), determining a gain for each pixel of the detail components on the basis of the base components, and multiplying the detail components by the gain determined for each pixel of the detail components. This makes it possible to suppress emphasis of the detail components in a dark portion with low S/N, thereby reducing noise amplification.

Advantages of the image processing device of the second embodiment will now be described.

To obtain an image having high S/N in a dark portion, it is necessary to perform imaging with a long exposure time. However, in the case of a scene with a wide dynamic range, imaging with a long exposure time saturates grayscale values in a portion corresponding to a bright object, resulting in loss of signal components. On the other hand, performing imaging with a short exposure time so as to prevent saturation of grayscale values in a portion corresponding to a bright object fails to keep S/N in a dark portion, resulting in a situation where the signal components of a dark object are buried in the noise components.

As a method to solve this problem, there is a technique that increases the dynamic range by combining an image obtained by imaging with a long exposure time and an image obtained by imaging with a short exposure time, as described in Patent Literature 1. However, when it is difficult to obtain multiple images having the same viewpoint due to constraints on imaging, e.g., when the imager is moving fast, the above method is inappropriate.

In the second embodiment, by taking, as input images, multiple images imaged with a short exposure time so as to prevent saturation of grayscale values in a portion corresponding to a bright object, performing alignment between the different multiple images, and adding the grayscale values of multiple pixels obtained in the multiple aligned images obtained by the alignment, it is possible to average random noise in a dark portion and improve S/N in the dark portion, as in the first embodiment.

Further, since the configurations of the displacement detectors 10-1 to 10-M, aligned image generators 20-1 to 20-M, and combiner 60 are the same as those of the first embodiment, the same advantages can be achieved.

Further, the gain setter 40 sets the gain Gj for each grayscale value on the basis of a grayscale conversion characteristic for compressing a dynamic range, and when each pixel is processed as the pixel Da0$i$ of interest, outputs the gain Gi for the pixel Da0$i$ of interest according to the grayscale value of the pixel Da0$i$ of interest; the combiner 60 controls the number of pixels used in the weighted summation or the weights in the weighted summation according to the gain Gi; the grayscale converter 50 converts the grayscale value of the pixel Dgi at the same position as the pixel Da0$i$ of interest in the combined image Dg according to the gain Gi. Specifically, for a dark portion, to which large gains Gj are applied in the grayscale converter 50, the number of pixels used in the weighted summation in the combiner 60 is made large, or the weights for pixels other than the pixel Da0$i$ of interest in the weighted summation are made large. This can enhance the S/N improvement effect. Thereby, it is possible to increase the dynamic range by virtue of improvement of the S/N in a dark portion while preventing saturation of the grayscale values in a portion corresponding to a bright object.

The present invention has been described above as an image processing device, but an image processing method implemented by the above image processing device also forms part of the present invention.

The processing performed in part or all of the components of the above image processing device, or part or all of the processing performed in the above image processing method may be executed by a computer including a processor. Thus, a program for causing a computer to execute the processing performed in part or all of the components of the above image processing device or part or all of the processing performed in the above image processing method, and a computer-readable recording medium storing the program also form part of the present invention.

Figure 14:
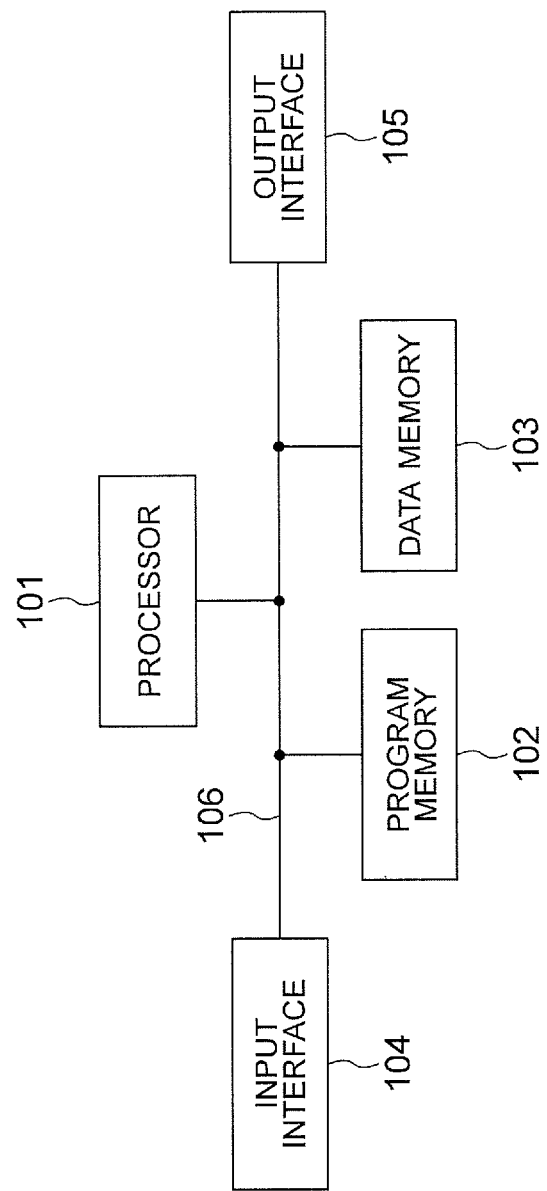
FIG. 14 is a block diagram illustrating a configuration of a computer that executes processing in the image processing device of the first or second embodiment of the present invention.

FIG. 14 illustrates an example of the computer. The computer of FIG. 14 includes a processor 101, a program memory 102, a data memory 103, an input interface 104, and an output interface 105, which are connected to each other through a data bus 106.

The input interface 104 is supplied with multiple images from the image memory 4, which stores imaged images from the imager 2, for example. These multiple images constitute the base image and reference images.

The processor 101 operates according to a program stored in the program memory 102, performs the processes in the respective parts of the image processing device of the first or second embodiment on multiple images input through the input interface 104, and output the combined image Dg (in the first embodiment) or the grayscale-converted image Dh (in the second embodiment) obtained by the processes, through the output interface 105.

The processing by the processor 101 is the same as that described in the first or second embodiment. Data generated in the course of the processing is held in the data memory 103.

It is possible to provide multiple computers illustrated in FIG. 14 and cause them to respectively execute the processes in the respective parts of the image processing device. The same applies to the case of causing computers to execute part or all of the processing in the image processing method.

The data memory 103 may serve as the image memory 4. In this case, imaged images output from the imager 2 are supplied to the data memory 103 through the input interface 104.

REFERENCE SIGNS LIST 10-1 to 10-M displacement detector, 20-1 to 20-M aligned image generator, 30, 30$a$, 30$b$, 30$c$ combiner, 31-1 to 31-M undefined pixel masker, 32 temporal direction weighting adder, 33 spatial direction weighting adder, 34 number-of-summed-pixels evaluator, 35 time-space integrator, 36-1 to 36-M undefined pixel interpolator, 40 gain setter, 50 grayscale converter, 60, 60*a*, 60*b*, 60*c* combiner, 62 temporal direction weighting adder, 63 spatial direction weighting adder, 65 time-space integrator.

The invention claimed is:

1. An image processing device for combining and outputting a plurality of input images consisting of a base image and one or more reference images, the image processing device comprising:
   one or more processors configured to operate as:
      one or more displacement detectors that respectively receive the one or more reference images as inputs, and each detect, for each pixel in the received reference image, a displacement relative to the base image;
      one or more aligned image generators that respectively receive the one or more reference images as inputs, and each generate, from the received reference image, an aligned image that has pixels and in which grayscale values of at least a subset of the pixels have been defined; and
      a combiner that combines the base image and the aligned images generated by the one or more aligned image generators and outputs a combined image,
   wherein each of the aligned image generators generates the aligned image by, for each pixel in the received reference image, moving the pixel according to the displacement for the pixel and assigning and giving a grayscale value of the pixel to a pixel position closest to a position of the moved pixel, and by giving no grayscale values to pixel positions in the aligned image to which no pixels in the reference image are assigned, and
   wherein the combiner takes each pixel in the base image as a pixel of interest and calculates a grayscale value of a pixel at the same position as the pixel of interest in the combined image by weighting and summing a grayscale value of the pixel of interest and grayscale values of pixels at the same position as the pixel of interest in the aligned images using weights depending on whether each pixel in each of the aligned images is a pixel whose grayscale value has been defined, or by weighting and summing the grayscale value of the pixel of interest and the grayscale values of the pixels at the same position as the pixel of interest in the aligned images after interpolating grayscale values of pixels whose grayscale values have not been defined.

2. The image processing device of claim 1, wherein the combiner includes:
   an undefined pixel masker that masks pixels in the aligned images whose grayscale values have not been defined; and
   a temporal direction weighting adder that calculates a temporal direction sum for the pixel of interest by weighting and summing the grayscale value of the pixel of interest and grayscale values of pixels at the same position as the pixel of interest in the one or more aligned images subjected to the masking by the undefined pixel masker.

3. The image processing device of claim 2, wherein the temporal direction weighting adder determines, for the pixel at the same position as the pixel of interest in each of the one or more aligned images, a weight used in the weighted summation in the temporal direction weighting adder, according to a difference or similarity in grayscale value between the pixel and the pixel of interest.

4. The image processing device of claim 2, wherein the combiner further includes:
   a spatial direction weighting adder that calculates a spatial direction sum for the pixel of interest by weighting and summing the grayscale value of the pixel of interest and grayscale values of pixels peripheral to the pixel of interest;
   a number-of-summed-pixels evaluator that calculates, as a number-of-summed-pixels evaluation value for the pixel of interest, the number of pixels used in the weighted summation in the temporal direction weighting adder for calculating the temporal direction sum for the pixel of interest, or a sum of weights used in the weighted summation; and
   a time-space integrator that calculates a three-dimensional sum for the pixel of interest by weighting and summing the temporal direction sum for the pixel of interest and the spatial direction sum for the pixel of interest on a basis of the number-of-summed-pixels evaluation value for the pixel of interest, and outputs the three-dimensional sum as the grayscale value of the pixel at the same position as the pixel of interest in the combined image.

5. The image processing device of claim 4, wherein the time-space integrator performs the weighted summation while increasing a weight for the temporal direction sum and decreasing a weight for the spatial direction sum as the number-of-summed-pixels evaluation value increases.

6. The image processing device of claim 1, wherein the combiner includes:
   an undefined pixel interpolator that interpolates grayscale values of pixels whose grayscale values have not been defined in the aligned images; and
   a temporal direction weighting adder that calculates a temporal direction sum for the pixel of interest by weighting and summing the grayscale value of the pixel of interest and the grayscale values of the pixels at the same position as the pixel of interest in the one or more aligned images that have had the grayscale values interpolated by the undefined pixel interpolator.

7. The image processing device of claim 1, wherein the one or more processors are further configured to operate as:
   a gain setter that sets, on a basis of a grayscale characteristic of the base image, a gain for each grayscale value, and outputs a gain for the pixel of interest according to the grayscale value of the pixel of interest; and
   a grayscale converter that calculates a grayscale value of a pixel at the same position as the pixel of interest in a grayscale-converted image by converting, on a basis of the gain for the pixel of interest, the grayscale value of the pixel at the same position as the pixel of interest in the combined image.

8. The image processing device of claim 7, wherein the combiner determines, on a basis of the gain for the pixel of interest, the number of pixels used in the weighted summation for the pixel of interest.

9. The image processing device of claim 4, wherein the one or more processors are further configured to operate as:
   a gain setter that sets, on a basis of a grayscale characteristic of the base image, a gain for each grayscale value, and outputs a gain for the pixel of interest according to the grayscale value of the pixel of interest; and a grayscale converter that calculates a grayscale value of a pixel at the same position as the pixel of interest in a grayscale-converted image by converting, on a basis of the gain for the pixel of interest, the grayscale value of the pixel at the same position as the pixel of interest in the combined image, wherein the temporal direction weighting adder determines, on a basis of the gain for the pixel of interest, the number of pixels used in the weighted summation in the temporal direction weighting adder for calculating the temporal direction sum for the pixel of interest, wherein the spatial direction weighting adder determines, on a basis of the gain for the pixel of interest, the number of pixels used in the weighted summation in the spatial direction weighting adder for calculating the spatial direction sum for the pixel of interest, and wherein the time-space integrator determines, on a basis of the number-of-summed-pixels evaluation value for the pixel of interest and the gain for the pixel of interest, a weight for the temporal direction sum for the pixel of interest and a weight for the spatial direction sum for the pixel of interest that are used in the weighted summation in the time-space integrator.

10. The image processing device of claim 7, wherein the input images are images obtained by performing imaging while determining exposure times so as to prevent saturation of grayscale values in a portion corresponding to a bright object.

11. The image processing device of claim 1, wherein the input images are images obtained by performing imaging using a single imager at different times.

12. An image processing method for combining and outputting a plurality of input images consisting of a base image and one or more reference images, the image processing method comprising:

for each of the one or more reference images, detecting, for each pixel in the reference image, a displacement relative to the base image;

for each of the one or more reference images, generating, from the reference image, an aligned image that has pixels and in which grayscale values of at least a subset of the pixels have been defined; and combining the base image and the generated aligned images to output a combined image, wherein for each of the one or more reference images, the generating generates the aligned image by, for each pixel in the reference image, moving the pixel according to the displacement for the pixel and assigning and giving a grayscale value of the pixel to a pixel position closest to a position of the moved pixel, and by giving no grayscale values to pixel positions in the aligned image to which no pixels in the reference image are assigned, and wherein the combining takes each pixel in the base image as a pixel of interest and calculates a grayscale value of a pixel at the same position as the pixel of interest in the combined image by weighting and summing a grayscale value of the pixel of interest and grayscale values of pixels at the same position as the pixel of interest in the aligned images using weights depending on whether each pixel in each of the aligned images is a pixel whose grayscale value has been defined, or by weighting and summing the grayscale value of the pixel of interest and the grayscale values of the pixels at the same position as the pixel of interest in the aligned images after interpolating grayscale values of pixels whose grayscale values have not been defined.

13. A non-transitory computer-readable recording medium storing a program for causing a computer to execute the image processing method of claim 12.

* * * * *